(12) United States Patent
Abe et al.

(10) Patent No.: US 9,167,037 B2
(45) Date of Patent: Oct. 20, 2015

(54) SERVER AND METHOD, NON-TRANSITORY COMPUTER READABLE STORAGE MEDIUM, AND MOBILE CLIENT TERMINAL AND METHOD

(75) Inventors: Shinichiro Abe, Tokyo (JP); Shigeru Arisawa, Tokyo (JP); Takashi Usui, Tokyo (JP); Seiji Esaka, Tokyo (JP); Shuhei Sonoda, Kanagawa (JP); Masayuki Takada, Tokyo (JP); Hiroyuki Yamasuge, Tokyo (JP)

(73) Assignee: Sony Corporation, Tokyo (JP)

( * ) Notice: Subject to any disclaimer, the term of this patent is extended or adjusted under 35 U.S.C. 154(b) by 15 days.

(21) Appl. No.: 13/394,429

(22) PCT Filed: Sep. 6, 2010

(86) PCT No.: PCT/JP2010/005467
§ 371 (c)(1),
(2), (4) Date: Mar. 6, 2012

(87) PCT Pub. No.: WO2011/030533
PCT Pub. Date: Mar. 17, 2011

(65) Prior Publication Data
US 2012/0163603 A1    Jun. 28, 2012

(30) Foreign Application Priority Data
Sep. 14, 2009 (JP) .................................. 2009-212083

(51) Int. Cl.
*H04L 9/08* (2006.01)
*H04L 29/08* (2006.01)
(Continued)

(52) U.S. Cl.
CPC ........... *H04L 67/1095* (2013.01); *G01S 5/0263* (2013.01); *G01S 19/14* (2013.01);
(Continued)

(58) Field of Classification Search
CPC ............ G06F 21/10; G06F 2221/2143; H04L 63/0428; H04L 9/083; H04L 63/062; H04L 2209/80; H04L 63/06; H04L 63/10; H04L 63/107; H04L 67/18; H04L 67/1095; H04L 9/08; H04W 4/028; H04W 4/001; H04W 4/02; G01S 5/0263; G01S 19/14
USPC .......................... 380/270, 273, 274, 277–279
See application file for complete search history.

(56) References Cited

U.S. PATENT DOCUMENTS 7,020,468 B2 *  3/2006  Squibbs et al. ................ 455/445
7,466,823 B2 * 12/2008  Vestergaard et al. .......... 380/227
(Continued)

FOREIGN PATENT DOCUMENTS

JP    2000-155710 A    6/2000
JP    2003-264874       9/2003
(Continued)

OTHER PUBLICATIONS

[No Author Listed], KCS Secure Telephone Book. Kanematsu Communications. http://houjin.kcs.ne.jp/solution/secure_top.html. Last accessed on Nov. 30, 2010.
(Continued)

*Primary Examiner* — Catherine Thiaw
(74) *Attorney, Agent, or Firm* — Wolf, Greenfield & Sacks, P.C.

(57) ABSTRACT

Systems and methods for operating in connection with mobile devices are described. The mobile devices may move between online and offline areas. In some instances, a prediction may be made as to when a mobile device will enter an offline area. The prediction may be based on sensor information. Data or a key may be transferred to the mobile device prior to entering the offline area.

9 Claims, 22 Drawing Sheets

(51) Int. Cl.
  *G01S 5/02* (2010.01)
  *G01S 19/14* (2010.01)
  *H04L 29/06* (2006.01)
  *H04W 4/00* (2009.01)
  *H04W 4/02* (2009.01)

(52) U.S. Cl.
  CPC ............ *H04L 63/107* (2013.01); *H04L 67/18* (2013.01); *H04W 4/001* (2013.01); *H04W 4/02* (2013.01); *H04W 4/028* (2013.01)

(56) References Cited

U.S. PATENT DOCUMENTS

| | | | |
|---|---|---|---|
| 7,594,116 B2* | 9/2009 | Bruns et al. | 713/171 |
| 2002/0114461 A1* | 8/2002 | Shimada et al. | 380/201 |
| 2003/0188174 A1* | 10/2003 | Zisowski | 713/189 |
| 2004/0103202 A1* | 5/2004 | Hildebrand et al. | 709/229 |
| 2004/0165727 A1* | 8/2004 | Moreh et al. | 380/278 |
| 2004/0219932 A1* | 11/2004 | Verteuil | 455/456.2 |
| 2005/0143098 A1* | 6/2005 | Maillard | 455/456.5 |
| 2005/0197127 A1* | 9/2005 | Nakasaku et al. | 455/445 |
| 2008/0132249 A1* | 6/2008 | Hamilton | 455/456.3 |
| 2008/0268816 A1* | 10/2008 | Wormald | 455/412.2 |
| 2009/0061912 A1* | 3/2009 | Brown et al. | 455/466 |
| 2009/0103725 A1* | 4/2009 | Tang et al. | 380/45 |
| 2009/0150970 A1* | 6/2009 | Hinds et al. | 726/1 |
| 2009/0247137 A1* | 10/2009 | Awad | 455/418 |
| 2009/0312005 A1* | 12/2009 | Mukundan et al. | 455/422.1 |
| 2010/0062789 A1* | 3/2010 | Agarwal et al. | 455/456.1 |
| 2010/0085947 A1* | 4/2010 | Ringland et al. | 370/338 |
| 2010/0197282 A1* | 8/2010 | Uchida | 455/414.1 |
| 2010/0266132 A1* | 10/2010 | Bablani et al. | 380/286 |
| 2010/0277367 A1* | 11/2010 | Dicke | 342/357.74 |
| 2010/0306544 A1* | 12/2010 | Lionetti et al. | 713/171 |
| 2010/0323715 A1* | 12/2010 | Winters | 455/456.1 |
| 2011/0055891 A1* | 3/2011 | Rice | 726/2 |
| 2011/0165861 A1* | 7/2011 | Wilson et al. | 455/411 |

FOREIGN PATENT DOCUMENTS

| | | |
|---|---|---|
| JP | 2003-309791 A | 10/2003 |
| JP | 2004-094577 A | 3/2004 |
| JP | 2004-364223 | 12/2004 |
| JP | 2007-081517 A | 3/2007 |
| JP | 2007-096746 A | 4/2007 |
| JP | 2007-151049 | 6/2007 |
| JP | 2007-251840 | 9/2007 |
| JP | 2008-199402 | 8/2008 |

OTHER PUBLICATIONS

International Search Report and Written Opinion mailed Nov. 16, 2010 in connection with International Application No. PCT/JP2010/005467.

International Preliminary Report on Patentability mailed Mar. 29, 2012 in connection with International Application No. PCT/JP2010/005467.

\* cited by examiner

FIG. 6

| ID | NAME | SIZE | ITEM | UPDATE NO. | OFFLINE-READY |
|---|---|---|---|---|---|
| 111 | AAA | 10 | TELEPHONE DIRECTORY | 10 | ○ |
| 112 | AAB | 10 | ACCOUNT NO. | 20 | ○ |
| 113 | AAC | 10 | HOUSEHOLD ACCOUNTS | 10 | ○ |
| 114 | AAD | 10 | MUSIC | 20 | |
| 115 | AAE | 10 | MUSIC | 10 | |
| 116 | AAF | 5 | PHOTO | 20 | |
| 117 | AAG | 5 | PHOTO | New | |
| 118 | AAH | 20 | VIDEO | New | |
| 119 | AAI | 15 | VIDEO | New | |
| 120 | AAJ | 25 | VIDEO | New | |

FIG. 7

| ID | NAME | SIZE | ITEM | UPDATE NO. | OFFLINE-READY |
|---|---|---|---|---|---|
| 111 | AAA | 10 | TELEPHONE DIRECTORY | 10 | ○ |
| 112 | AAB | 10 | ACCOUNT NO. | 20 | ○ |
| 113 | AAC | 10 | HOUSEHOLD ACCOUNTS | 10 | ○ |
| 114 | AAD | 10 | MUSIC | 20 | |
| 115 | AAE | 10 | MUSIC | 10 | |
| 116 | AAF | 5 | PHOTO | 20 | |
| 117 | AAG | 5 | PHOTO | New | |
| 118 | AAH | 20 | VIDEO | New | |
| 119 | AAI | 15 | VIDEO | New | |
| 120 | AAJ | 25 | VIDEO | New | |

FIG. 8

| ID | NAME | SIZE | ITEM | UPDATE NO. | OFFLINE-READY |
|---|---|---|---|---|---|
| 111 | AAA | 10 | TELEPHONE DIRECTORY | 10 | ○ |
| 112 | AAB | 10 | ACCOUNT NO. | 20 | ○ |
| 113 | AAC | 10 | HOUSEHOLD ACCOUNTS | 10 | ○ |
| 114 | AAD | 10 | MUSIC | 20 | |
| 115 | AAE | 10 | MUSIC | 10 | |
| 116 | AAF | 5 | PHOTO | 20 | |
| 117 | AAG | 5 | PHOTO | New | |
| 118 | AAH | 20 | VIDEO | New | |
| 119 | AAI | 15 | VIDEO | New | |
| 120 | AAJ | 25 | VIDEO | New | |

SERVER AND METHOD, NON-TRANSITORY COMPUTER READABLE STORAGE MEDIUM, AND MOBILE CLIENT TERMINAL AND METHOD

CROSS-REFERENCE TO RELATED APPLICATIONS

The present application is a national stage entry filed under 35 U.S.C. §371 of PCT Application No. PCT/JP2010/005,467 filed Sep. 6, 2010, which claims priority to Japanese Patent Application 2009-212083 filed Sep. 14, 2009, both of which are incorporated herein by reference in their entireties.

TECHNICAL FIELD

The present invention relates to an information processing apparatus and an information processing method that perform information transfer and synchronization processing with a client terminal connected to a network via a base station or an access point, a wireless communication apparatus, a wireless communication method, a computer program, and a wireless communication system that perform information transfer and synchronization processing with a server through connection with a network via a base station or an access point. In particular, the present invention relates to an information processing apparatus and an information processing method that allow high-security transfer and synchronization processing of information to be used to be performed with a client terminal that goes offline at arbitrary timing as a result of movement or the like and also to a wireless communication apparatus, a wireless communication method, a computer program, and a wireless communication system that allow high-security information transfer or synchronization processing of information to be used to be performed with a server through connection with a network via a base station or an access point while going offline at arbitrary timing as a result of movement.

BACKGROUND ART

Wireless communication has been used as a technology for eliminating burdens of cabling work in traditional wired communication and for realizing mobile communication. For example, wireless LANs (local area networks) using standards, such as an IEEE (The Institute of Electrical and Electronics Engineers) 802.11 standard, have already been widely used. In recent years, broadband Internet connection services using wireless LANs typified by HotSpot (registered trademark) have become popular. That is, base stations and access points are installed at cafes, hotels, fast food restaurants, stations, airports and so on to offer service areas where the Internet is available.

With such wireless communication services, users can enjoy services, such as IP (interne protocol) phone and access to a WWW (World Wide Web) information domain, even while on the go. That is, at various places, a client terminal can perform transfer or synchronization processing on data to be used, through connection to a server via a nearest base station or access point. Thus, more and more information devices that function as client terminals are equipped with wireless LAN (local area network) capabilities.

In recent years, outdoor wireless LAN services are also spreading rapidly. The number of access points installed at public places is increasing, and the service areas are expanding continuously. However, the service areas have not covered all places yet, and thus, for example, the client terminal may fall into an offline state in which it is not connectable to any base station or access point, while the client terminal is in transit. While offline, the client terminal is unable to perform information transfer or synchronization processing with the server.

When the information transfer or synchronization processing between the client terminal and the server is performed by a manual operation of the user before the client terminal goes offline, the user can use the latest information even with the client terminal being offline. However, the user performing the manual operation each time the client terminal goes offline is cumbersome and is not practical.

Alternatively, when the information transfer or synchronization processing between the client terminal and the server is periodically performed, the user does not have to perform the cumbersome manual operation. However, since the transfer or synchronization processing of data to be used is not necessarily always performed before the client terminal goes offline, there may be cases in which, when the client terminal goes offline, the user cannot perform processing, such as reference, edit, and deletion, on the data to be used.

When the information to be used is stored in the client terminal so as to be usable while offline, highly confidential information such as data related to personal information can be leaked when the client terminal falls into the hands of a third party or is left unoperated for a long time. This leads to a problem of decreased security.

For example, a mobile-phone total management system in which personal information, such as phone numbers and email addresses, are stored in a server protected with robust security rather than being held in mobile phones is available (e.g., refer to "http://houjin.kcs.ne.jp/solution/secure_top.html", available as of Jul. 23, 2009). With the system, a telephone directory can be used with a mobile phone upon connection to the server. In addition, even if the mobile phone is lost or stolen, the precious data is safely protected. Also, the system allows an application for a telephone directory to be downloaded for offline use and also has a function of forcibly deleting the downloaded telephone directory through remote operation and a function of automatically deleting the telephone directory on the basis of an authentication failure count. However, in order to use the telephone directory with the mobile phone being offline, the user has to download the telephone-directory application before the mobile phone goes offline. Also, since the downloaded telephone-directory application is kept stored in the mobile phone, the security declines compared to a case in which the telephone directory is stored in only the server. Use of the downloaded telephone-directory application only when the client terminal is offline involves downloading the telephone-directory application before the terminal goes offline and then deleting the downloaded telephone-directory application when the terminal goes online again, which is a cumbersome manual operation for the user.

A scheme in which synchronization processing is executed each time changes are made to data on the server or the client terminal and a scheme in which a request as to whether or not synchronization is to be performed is issued to the server manually, periodically, or each time the client terminal logs in are available, such as those used in Google Sync, Mobile Me, My Phone, and so on. In those schemes, however, since the communication state of the client terminal and the synchronization timing are not correlated with each other, information to be used may not generally be synchronized before the client terminal goes offline.

Japanese Unexamined Patent Application Publication No. 2004-94577 discloses an information terminal device that issues, when the strength of radio waves for communication decreases during synchronization processing, an alarm to a user so that the synchronization processing is not interrupted.

Japanese Unexamined Patent Application Publication No. 2003-309791 discloses a storage device that can record data, received over radio waves, to a recording medium and allows data loss and partial-data recording to be prevented when the radio-wave state deteriorates, by suspending an operation for writing data to the recording medium or generating an alarm sound for the user.

Japanese Unexamined Patent Application Publication No. 2000-155710 discloses a synchronization processing method in which, when a server and a local storage device are performing synchronization with each other, the synchronization processing is executed for each resource in accordance with a schedule specifying date and time and the day of a week when the synchronization processing for each resource is to be executed.

Japanese Unexamined Patent Application Publication No. 2007-96746 discloses a terminal equipped with a mobile-phone function. For use of a telephone directory, the terminal downloads information of a personal telephone directory from an authentication server.

Japanese Unexamined Patent Application Publication No. 2007-81517 discloses an information storage method. In the method, a mobile communication device stores, in its memory, only an information identifier ID and information recognized by the owner of the mobile communication device. Those pieces of information are managed in an information management server through matching with corresponding information in the information management server. The method, however, has a shortcoming in that the information may not generally be checked when the client terminal goes offline.

CITATION LIST

Patent Literature

PTL 1: Patent 2004-94577
PTL 2: Patent 2003-309791
PTL 3: Patent 2000-155710
PTL 4: Patent 2007-96746
PTL 5: Patent 2007-81517

Non Patent Literature

NPL 1: "http://houjin.kcs.ne.jp/solution/secure_top.html", available as of Jul. 23, 2009

SUMMARY OF INVENTION

Technical Problem

It is desirable to provide an improved information processing apparatus, information processing method, and computer program that are capable of preferably performing information transfer and synchronization processing with a client terminal connected to a network via a base station or an access point.

It is further desirable to provide an improved information processing apparatus, information processing method, computer program that allow high-security transfer or synchronization processing of information to be used to be performed with a client terminal that goes offline at arbitrary timing as a result of movement or the like.

It is also desirable to provide an improved wireless communication apparatus, wireless communication method, computer program, and wireless communication system that are capable of preferably performing information transfer and synchronization processing with a server connected to a network via a base station or an access point.

It is further desirable to provide an improved wireless communication apparatus, wireless communication method, computer program, and wireless communication system that allow high-security transfer or synchronization processing of information to be used to be performed with a server through connection with a network via a base station or an access point, while going offline at arbitrary timing as a result of movement.

Solution to Problem

The term "system" as used herein refers to a physical collection of multiple apparatuses (or functional modules that realize particular functions) and the apparatuses or the functional modules may be or may not be provided in a single housing.

Aspects of the present invention can provide an improved information processing apparatus, information processing method, and/or computer program that allow high-security transfer or synchronization processing of information to be used to be performed with a client terminal that goes offline at arbitrary timing as a result of movement or the like.

Aspects of the present invention can also provide an improved wireless communication apparatus, wireless communication method, computer program, and/or wireless communication system that allow high-security transfer or synchronization processing of information to be used to be performed with a server through connection with a network via a base station or an access point, while going offline at arbitrary timing as a result of movement.

According to one aspect of the present invention, a server is provided for operating in connection with a mobile client terminal as part of a communication network. The server comprises a processing unit, an input configured to receive sensor information from the client terminal, and memory storing instructions which, when executed by the processing unit, cause the processing unit to determine a current location of the client terminal based at least partially on the sensor information and predict, based at least partially on the current location of the client terminal, a time at which the client terminal will enter an offline area. The server further comprises an output configured to transmit to the client terminal (a) data to be used by the client terminal while offline; or (b) a key to decrypt data stored on the client terminal.

According to one non-limiting embodiment of such an aspect, the processing unit is further configured to, upon execution of the instructions stored in memory, analyze content received from the client terminal to determine a destination of the client terminal and, based at least partially on the current location of the client terminal and the destination of the client terminal, predict a path of movement of the client terminal. The processing unit may be further configured to execute a communication prediction algorithm to compare communication information indicative of communication status against the predicted path of movement of the client terminal.

According to another non-limiting embodiment of such an aspect, the processing unit may be configured to initiate transmission to the client terminal of data to be used by the client terminal while offline prior to the predicted time at which the client terminal will enter the offline area.

According to another non-limiting embodiment of such an aspect, the processing unit is configured to initiate transmission to the client terminal of a key to decrypt data stored on the client terminal prior to the predicted time at which the client terminal will enter the offline area.

According to another aspect of the invention, a method is provided of operating a server configured to communicate wirelessly with a mobile client terminal. The method comprises receiving, at the server, sensor information from the client terminal, and determining a current location of the client terminal by analyzing the sensor information. The method further comprises predicting a time at which the client terminal will enter an offline area based, at least partially, on the current location of the client terminal. The method further comprises transferring, from the server to the client terminal prior to the predicted time at which the client terminal will enter the offline area, (a) data to be used by the client terminal while offline, or (b) a key to decrypt data stored on the client terminal.

According to one non-limiting embodiment of such an aspect, predicting the time at which the client terminal will enter an offline area comprises: (i) determining a destination of the client terminal; (ii) determining, based at least partially on the current location of the client terminal and the destination of the client terminal, a predicted path of the client terminal; and (iii) determining if and where the offline area is located on the predicted path of the client terminal. Determining the destination of the client terminal may comprise analyzing private content of the client terminal using the server. Determining if and where the offline area is located on the predicted path of the client terminal may comprise analyzing communication information stored on the server and indicative of communication status along the predicted path.

According to another aspect of the present invention, a non-transitory computer readable storage medium is provided encoded with instructions which, when executed by a server coupled to a client terminal via a network, cause the server to perform a method of operation comprising receiving, at the server, sensor information from the client terminal, and determining a current location of the client terminal by analyzing the sensor information. The method further comprises predicting a time at which the client terminal will enter an offline area based, at least partially, on the current location of the client terminal, and transferring, from the server to the client terminal prior to the predicted time at which the client terminal will enter the offline area, (a) data to be used by the client terminal while offline, or (b) a key to decrypt data stored on the client terminal.

According to another aspect of the present invention, a mobile client terminal for operating in connection with a server as part of a communication network is provided. The client terminal comprises a processing unit and memory storing instructions which, when executed by the processing unit, cause sensor information to be obtained. The client terminal further comprises an input configured to receive from the server, before a predicted time at which the client terminal will enter an offline area which is based at least partially upon the sensor information, (a) data to be used by the client terminal while offline, or (b) a key to decrypt data stored on the client terminal.

According to another aspect of the present invention, a method of operating a mobile client terminal is provided. The method comprises storing content (which may be private content in some non-limiting embodiments) on the client terminal in an encrypted state, receiving a decryption key from an external device, and decrypting the content using the decryption key. The method further comprises providing the content while the client terminal is located in an offline area, and deleting the decryption key upon the client terminal entering an online area.

According to one non-limiting embodiment of such an aspect, providing the content while the client terminal is located in an offline area comprises providing the content on a display of the client terminal. According to another non-limiting embodiment, the method further comprises transferring sensor information to the external device, and wherein receiving the decryption key from the external device is performed in response to transferring the sensor information. The method may further comprise transferring a public key to the external device, and wherein the decryption key is a common key encrypted with the public key. Further still, the method may comprise generating a private key and decrypting the decryption key using the private key. According to another non-limiting embodiment of such an aspect, the external device may be a server.

According to another aspect of the present invention, a computer readable storage medium is provided including instructions which, when executed, cause a mobile client terminal to perform a method of operation comprising storing content on the client terminal in an encrypted state, receiving a decryption key from an external device, and decrypting the content using the decryption key. The method further comprises providing the content while the client terminal is located in an offline area, and deleting the decryption key upon the client terminal entering an online area.

According to another aspect of the present invention, a server for operating in connection with a mobile client terminal as part of a communication network is provided. The server comprises a processing unit, an input configured to receive sensor information from the client terminal, and memory storing instructions which, when executed by the processing unit, cause the processing unit to determine a current location of the client terminal based at least partially on the sensor information and predict, based at least partially on the current location of the client terminal, a time at which the client terminal will move from an offline area to an online area. The server further comprises an output configured to transmit to the client terminal after the predicted time at which the client terminal will move from the offline area to the online area, a request to delete (a) data transferred to the client terminal prior to the client terminal entering the offline area, or (b) a key transferred to the client terminal prior to the client terminal entering the offline area to decrypt data stored on the client terminal.

According to another aspect of the present invention, a method of operating a server configured to communicate wirelessly with a mobile client terminal is provided. The method comprises receiving, at the server, sensor information from the client terminal, and determining a current location of the client terminal by analyzing the sensor information. The method further comprises predicting a time at which the client terminal will move from an offline area to an online area based, at least partially, on the current location of the client terminal. The method further comprises transferring, from the server to the client terminal after the predicted time at which the client terminal will move from the offline area to the online area, a request to delete (a) data transferred to the client terminal prior to the client terminal entering the offline area, or (b) a key transferred to the client terminal prior to the client terminal entering the offline area to decrypt data stored on the client terminal.

According to another aspect of the present invention, a non-transitory computer readable storage medium is provided encoded with instructions which, when executed by a server coupled to a client terminal via a network, cause the server to perform a method of operation. The method comprises receiving, at the server, sensor information from the client terminal, determining a current location of the client terminal by analyzing the sensor information, and predicting a time at which the client terminal will move from an offline area to an online area based, at least partially, on the current location of the client terminal. The method further comprises transferring, from the server to the client terminal after the predicted time at which the client terminal will move from the offline area to the online area, a request to delete (a) data transferred to the client terminal prior to the client terminal entering the offline area, or (b) a key transferred to the client terminal prior to the client terminal entering the offline area to decrypt data stored on the client terminal.

According to another aspect of the present invention, a client operating in connection with a server as part of a communication network is provided. The client comprises a processing unit, and memory storing instructions which, when executed by the processing unit, cause sensor information to be obtained and cause the processing unit to delete, after a predicted time at which the client terminal is to move from an offline area to an online area, (a) data used by the client while in the offline area and/or (b) a key to decrypt data stored on the client.

Further objects, features, and advantages of the present invention will become apparent from the following detailed description in conjunction with embodiments of the present invention and accompanying drawings.

BRIEF DESCRIPTION OF DRAWINGS

FIG. 6 shows an example of the configuration of an information transfer/synchronization list.

FIG. 7 shows an example of the configuration of the information transfer/synchronization list.

FIG. 8 shows an example of the configuration of the information transfer/synchronization list.

DESCRIPTION OF EMBODIMENTS

Embodiments of the present invention will be described below in detail with reference to the accompanying drawings.

Figure 1:
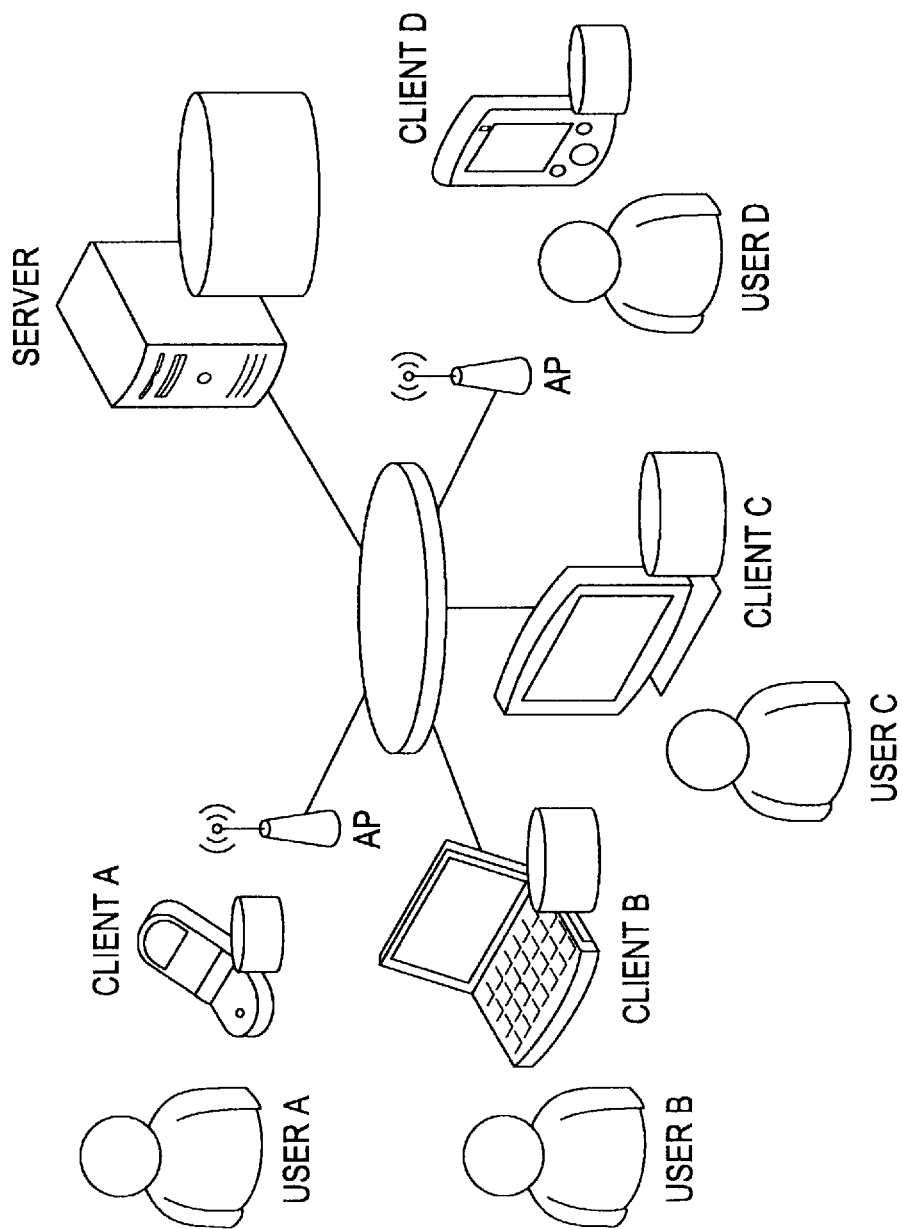
FIG. 1 schematically shows the configuration of a communication system according to one embodiment of the present invention.

FIG. 1 schematically shows the configuration of a communication system according to one embodiment of the present invention. In the illustrated communication system, information transfer or synchronization is performed between a server and client terminals through a network.

The network for the illustrated communication system includes a wired communication section connected using wired cables and a wireless communication section connected using radio-wave communication. The wired communication section includes, for example, a wired network such as an optical fiber network and an ADSL (asymmetric digital subscriber line). The wireless communication section is constituted by a wireless network, such as a Wi-Fi (Wireless Fidelity) network, a W-CDMA (Wideband-Code Division Multiple Access) network, an LTE (Long Term Evolution) network, or a WiMAX (Worldwide Interoperability for Microwave Access) network. Connection to the wireless communication section can be established via a base station or an access point (AP).

The server is provided in the wireless communication section. Although only one server is shown in FIG. 1 for simplicity of illustration, multiple servers may also be provided. The server holds all data of users A, B, C, and D and performs processing, such as information transfer and synchronization, with the client terminals A to D.

Each client terminal is connected to the communication system through the wired communication section or the wireless communication section. In the example illustrated in FIG. 1, the client terminal B in the possession of the user B and the client terminal C in the possession of the user C are connected to the communication system through the wired communication section.

The client terminal A in the possession of the user A and the client terminal D in the possession of the user D are connected to the wireless communication section via corresponding a nearest base station(s) or access points (AP). The service areas of the base stations or access points are "online areas" in which the client terminals A and D go online. An area that does not belong to any of the service areas of the base stations and the access points corresponds to an offline area in which the client terminals A and D go offline.

The client terminals A to D are, for example, thin clients that depend on the server to manage resources, such as applications and files. New information is transferred from the server to each of the client terminals A to D. Alternatively, each of the client terminals A to D performs synchronization processing with the server to store data to be used on a storage device, such as a local disk. In the present embodiment, since all data of the users are stored in the server, each user can check his/her data whichever client terminal he or she logs in.

In such a communication system, in general, information transfer or synchronization is performed between the server and the client terminal by a manual operation of the user or information transfer or synchronization processing between the server and the client terminal is periodically started. However, in the use environment in which the client terminal moves to an offline area at arbitrary timing, it is not practical for the user to perform the manual operation for the information transfer or synchronization each time before the client terminal goes offline. Also, in the periodic information transfer or synchronization processing, synchronization of information to be used is not necessarily always performed when the terminal goes offline, as described above.

In contrast, in the present embodiment, the server is adapted to predict whether or not an offline area exists on the movement path of the client terminal by using a communication prediction algorithm. On the basis of the result of the communication prediction performed by the server, the client terminal transfers or synchronizes data to be used, before it goes offline. Consequently, the client terminal can refer to, edit, and delete the data to be used, even when the client terminal is offline. In addition, deletion of the data when the client terminal returns to an online area makes it possible to reduce the problem of information leakage.

A procedure for data exchange performed between the server and the client terminal in the communication system illustrated in FIG. 1 will be described next with reference to FIGS. 2 to 5. It is assumed that the client terminal is connected to the server through connection with the wireless communication section via the base station or the access point.

Figure 2:
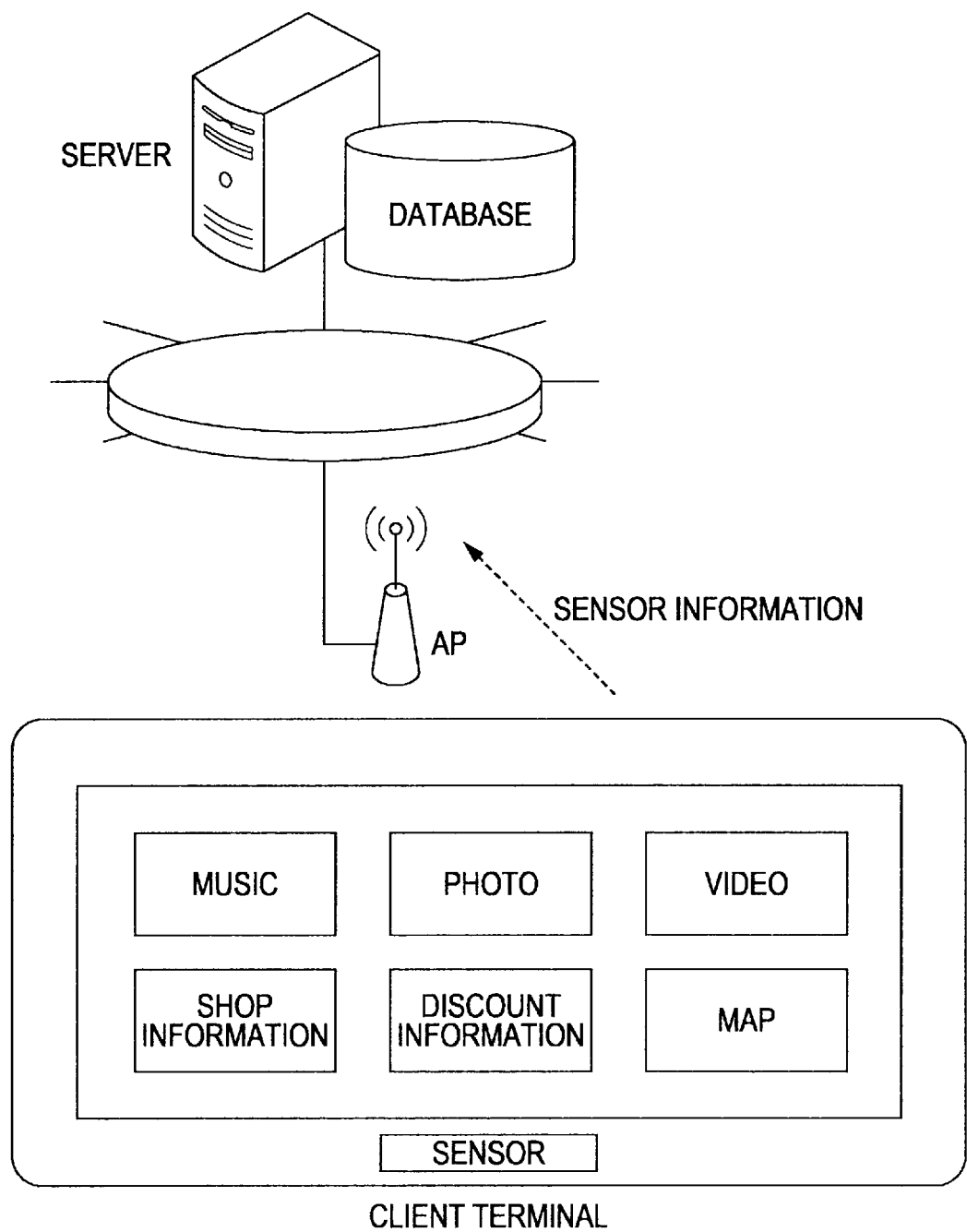
FIG. 2 illustrates a procedure for data exchange between a server and a client terminal in the communication system shown in FIG. 1.

When the user logs in to the client terminal, the client terminal transmits sensor information, obtained from a sensor in the client terminal and used for position recognition, to the server (see FIG. 2). The sensor information may be sensor information for estimating the position information of the client terminal. Examples of such sensor information include position information measured based on a GPS (global positioning system) reception radio waves, received-signal strength information (RSSI [received signal strength indicator]) of a Wi-Fi base station, and acceleration information measured by an acceleration sensor. The sensor information may also be sensor information, obtained by an acceleration sensor or an image recognition device, for estimating the movement state of the client terminal.

When the user successfully logs in to the client terminal and connects to the server to go online, it is possible to perform online operations, such as reference, edit, and deletion, on various types of user information stored in the server. In the example shown in FIG. 2, user information, such as music, photos, videos, shop information, discount information, and maps, stored in the server is available on the client terminal.

The server has a communication information database that stores communication information previously transmitted from the client terminals, and keeps track of communication states of multiple wireless systems with respect to times and locations as the communication information. Examples of the communication information include a registration map of the service area locations of distributed access points and transfer rates and radio-wave strengths in the service areas. The server has a contents analysis algorithm, a movement prediction algorithm, a communication prediction algorithm, and a synchronization algorithm.

The server estimates the current position or the movement state of the client terminal on the basis of the sensor information received from the client terminal. Subsequently, the server analyzes the contents of the client-terminal private content (e.g., text information, such as a schedule, mail, and a memo pad, and information of a photographed image) stored in the internal database on the basis of the contents analysis algorithm and compares the result of the analysis with the estimated current position or movement state of the client terminal to predict action of the client terminal, i.e., to predict a destination to which the client terminal moves from now. The server then determines the client-terminal movement path from the current position to the destination on the basis of the movement prediction algorithm.

On the basis of the communication prediction algorithm, the server compares the predicted movement prediction information (the destination and the movement route) with the communication information, such as reception radio-wave strengths at access points, to thereby determine future communication information of the client terminal, i.e., to determine whether or not an offline area exists on the movement path of the client terminal.

Upon determining that an offline area exists on the movement path of the client terminal, the server determines an offline prediction position or offline prediction time at which the client terminal reaches the offline area and also determines an online return prediction position or online return prediction time at which the client terminal returns from the offline area to an online area.

The offline prediction position refers to a position at which the client terminal is predicted to reach an offline area on the movement path thereof. The offline prediction position is determined from a result of comparison between the predicted client-terminal movement path and a base-station or access-point location registration map stored in the communication information database. The offline prediction time is time at which the client terminal that is moving along the movement path is estimated to reach an offline area. The offline prediction time is determined from a distance, derived from the offline prediction position and the movement path from the current position, and the movement speed of the client terminal. The online return prediction position refers to a position at which the client terminal is estimated to reach an online area again on the movement path thereof. The online return prediction position is determined from a result of comparison between the predicted client-terminal movement path and a base-station or access-point location registration map stored in the communication information database. The online return prediction time is time at which the client terminal that is moving along the movement path is predicted to reach an online area. The online return prediction time is determined from a distance, derived from the online return prediction position and the movement path from the current position, and the movement speed of the client terminal.

Figure 3:
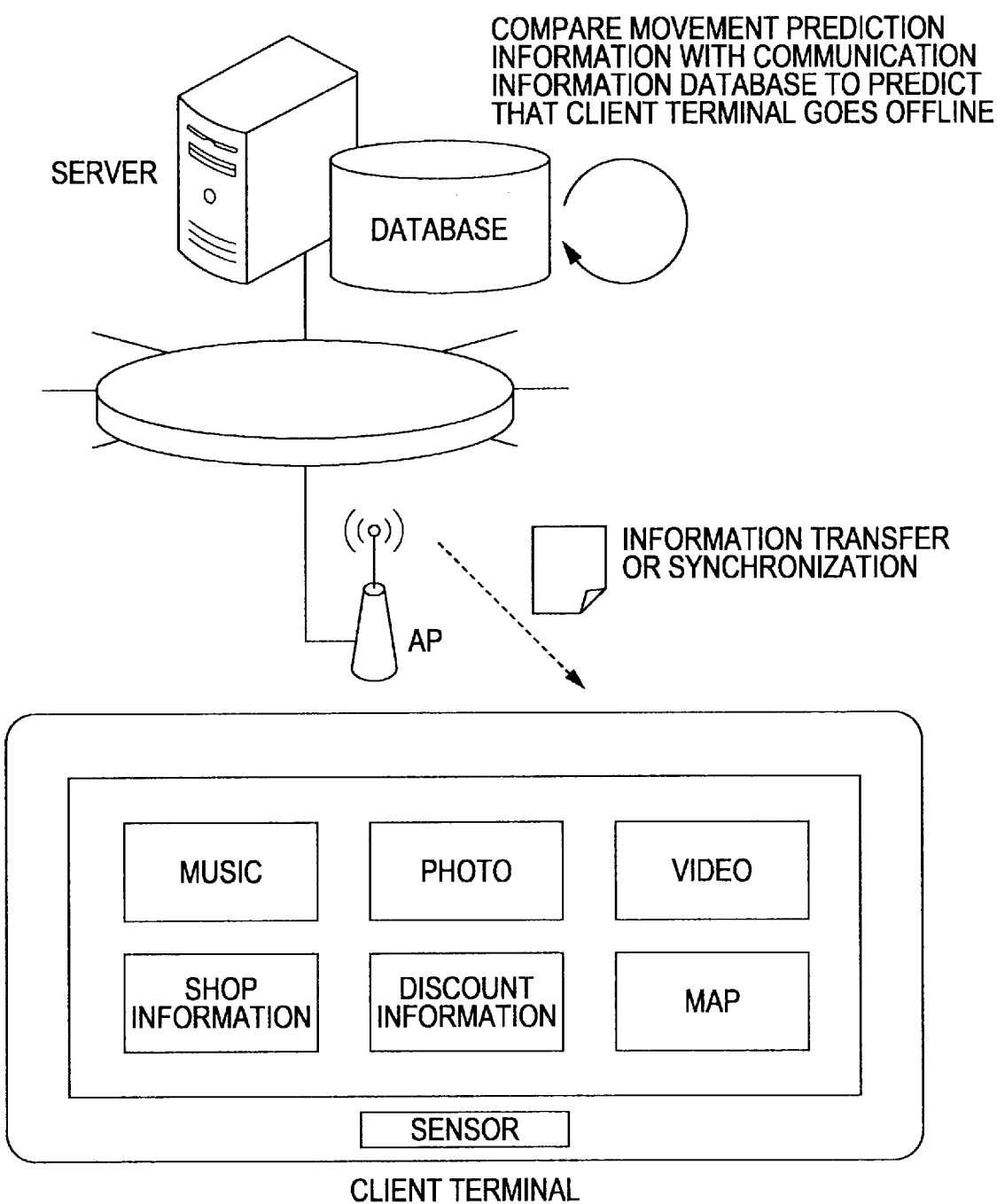
FIG. 3 illustrates the procedure for data exchange between the server and the client terminal in the communication system shown in FIG. 1.

Before the client terminal goes offline, the server transmits information for information transfer or synchronization and the client terminal receives and stores the information (see FIG. 3). During the processing, information to be used while the client terminal is offline is preferentially transferred or synchronized. The server also terminates a connection with a client terminal determined to be not connectable, until a connection condition is satisfied.

In this case, the information to be used while the client terminal is offline is, for example, personal information such as a telephone directory, account information, and household accounts. The information to be preferentially transmitted before the client terminal goes offline may be pre-specified. The information to be preferentially transmitted may also be specified by the user.

As described above, the server predicts that the client terminal is reaching an offline area, and automatically performs information transfer or synchronization processing. Thus, even with the client terminal being offline, the user can perform processing, such as reference, edit, and deletion, on the user information, such as a telephone directory, account information, and household accounts (see FIG. 4). The information to be transferred or synchronized may be limited in advance. In such a case, even when the client terminal that is offline is lost, the risk of information leakage can be reduced.

When the client terminal reaches the online return prediction position at which it returns from an offline area to an online area or the online return prediction time is reached, the server attempts to connect to the client terminal. When the connection succeeds, the server issues, to the client terminal, a request for deleting the information transmitted before the client terminal went offline.

In response to the request from the server, the client terminal deletes the information received from the server, when it goes online. After the processing, the client terminal can perform online operations, such as reference, edit, and deletion, on various types of user information stored in the server (see FIG. 5).

The server has a private content database (described below) that stores private content for each user. The private content also contains personal information, such as a telephone directory, account information, and household accounts, in addition to playback content, such as music, photos, and videos, in the possession of each user. The personal information, such as a telephone directory, account information, and household accounts, is information to be used while the client terminal is offline and that is to be preferentially transmitted before the client terminal goes offline. When the user logs in to the server via the corresponding client terminal and is online, the private content is to be subjected to the information transfer or synchronization processing.

The server manages, on an information transfer/synchronization list, each user's private content to be subjected to the information transfer or synchronization processing. FIG. 6 illustrates an example of the configuration of the information transfer/synchronization list. In the illustrated information transfer/synchronization list, entries for management are registered for each piece of private content. Information of an ID for identifying content, a content name, a content data size, a content item (type), an update number, and "offline-ready" information are registered in the entries. The "offline-ready" information indicates whether or not the corresponding content is to be preferentially transmitted before the client terminal goes offline. Whether or not the content is offline-ready is pre-specified. Whether or not the content is offline-ready may also be automatically specified according to the item of the content or may be manually specified by the user.

The server refers to the information transfer/synchronization list to determine an order of priority of content to be subjected to the information transfer or synchronization processing with the client terminal of the user. When the client terminal is online or before the server determines that the client terminal is offline, the server refers to the update number to select newly updated content as next content to be subjected to the information transfer or synchronization processing. In the example illustrated in FIG. 6, recently updated pieces of content with content IDs of 117, 118, and 119 are determined as content to be transferred or synchronized, as shown in FIG. 7. Since there is a free data space in this case, content with a content ID of 116 is also determined as content to be transferred or synchronized.

On the other hand, upon determining that the client terminal is going offline, the server determines content to be preferentially transmitted, on the basis of whether or nor it is offline-ready, not the update number. In the illustrated example, the content of personal information, such as a telephone directory, account information, and household accounts with content IDs of 111, 112, and 113, is preset as being offline-ready and is determined as content to be preferentially transmitted. When there is a free data space, the private content with contents IDs of 117 and 118 is also determined as content to be transferred or synchronized in conjunction with the preferential transmission (see FIG. 8).

The offline-ready content may be set automatically or by a manual operation of the user in accordance with the degree of necessity on the client terminal when it is offline. For example, it is possible to set the offline-ready content by referring to user history information, such as history of user's previous operations when the client terminal was offline.

The amount of data of the information to be transferred or synchronized in advance generally has to be reduced to the amount of data with which the transmission processing is completed before the client terminal goes offline. For example, rather than transmitting all of data determined to be preferentially transmitted, only part included in the data and updated from the previous data may be synchronized. Alternatively, an amount of time taken for the transmission may be pre-determined on the basis of the amount of data of information to be transmitted to the client and the information transfer or synchronization processing may be started at time that is earlier than the offline prediction time.

Figure 9:
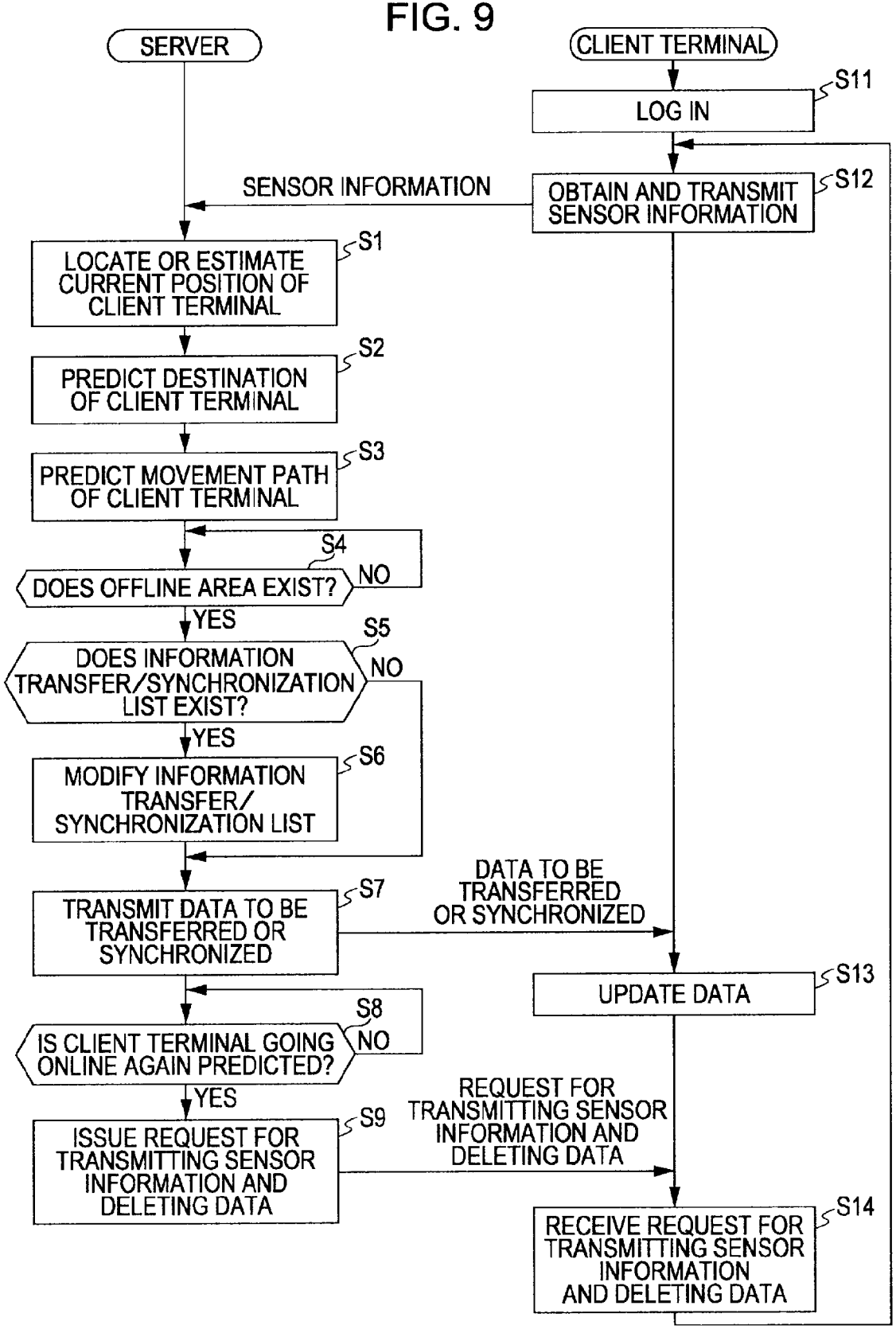
FIG. 9 is a flowchart of processing procedures, executed by the server and the client terminal, for realizing the data exchange procedure illustrated in FIGS. 2 to 5.

FIG. 9 is a flowchart of processing procedures, executed by the server and the client terminal, for realizing the data exchange procedure illustrated in FIGS. 2 to 5.

When the user logs in to the client terminal in step S11, the client terminal transmits sensor information, obtained from the sensor in the client terminal and used for position recognition, to the server in step S12.

Upon receiving the sensor information from the client terminal, in step S1, the server locates or estimates the current position of the client terminal on the basis of sensor information stored in the sensor-information database.

Next, in step S2, on the basis of the contents analysis algorithm, the server analyzes the contents of the client-terminal private content (e.g., text information of a schedule, mail, and a memo pad, and information of photographed images), stored in the private content database (described below), to predict a destination to which the client terminal moves from now.

Next, in step S3, on the basis of the movement prediction algorithm, the server determines the client-terminal movement path from the current position, located or estimated based on the sensor information, to the predicted destination.

As described above, the server has the communication information database that stores communication information previously transmitted from the client terminals, and keeps track of communication states of multiple wireless systems with respect to times and locations. Examples of the communication information include transfer rates and radio-wave strengths in the service areas of distributed access points. Upon obtaining the movement path of the client terminal in step S3, the server further estimates future communication information of the client terminal on the basis of the communication prediction algorithm. That is, in step S4, the server determines whether or not an offline area exists on the predicted movement path, by comparing the predicted movement prediction information (the destination and the movement route) with communication information such as the reception radio-wave strengths of the access points.

When the server determines that the client terminal is present in an offline area (YES in step S4), the process proceeds to step S5 in which the server further checks whether or not the information transfer/synchronization list (see FIG. 6) of the corresponding user is managed in the private content database. When the corresponding information transfer/synchronization list exists (YES in step S5), the process proceeds to step S6 in which the server modifies the information transfer/synchronization list in accordance with whether or not each entry is offline-ready.

Subsequently, in step S7, the server determines information to be preferentially transferred or synchronized before the client terminal goes offline, on the basis of the information transfer/synchronization list and so on, and transmits the determined information to the client terminal in advance. The amount of data of the information to be transferred or synchronized in advance generally has to be reduced to the amount of data with which the transmission processing is completed before the client terminal goes offline. Alternatively, the server may set transmission start time that is earlier than the offline prediction time so that the transmission processing is completed earlier than the client terminal goes offline. After the processing in step S7, the server terminates the connection with the client terminal that is determined to be offline.

In turn, in step S13, the client terminal updates the held data on the basis of the information received from the server. Consequently, even with the client terminal being offline, the user can perform processing, such as reference, edit, and deletion, on the user information, such as a telephone directory, account information, and household accounts (see FIG. 4).

The server determines the online return prediction position or the online return prediction time by comparing the predicted movement prediction information (the destination and the movement route) with the communication information such as the reception radio-wave strengths of access points. When the server predicts that the client terminal is going online again (YES in step S8), the process proceeds to step S9 in which the server resumes the connection with the client terminal and issues, to the client terminal, a request for transmitting the sensor information and deleting the data transmitted before the client terminal went offline.

In turn, upon going online again, the client terminal resumes the connection with the server. In step S14, the client terminal receives, from the server, the request for transmitting the sensor information and deleting the data, and deletes the corresponding data. Then, the process returns to step S12 in which the client terminal transmits sensor information. Thereafter, the server and the client terminal repeatedly execute processing that is similar to that described above.

FIGS. 10 to 13 illustrate other examples of the procedure of data exchange performed between the server and the client terminal in the communication system shown in FIG. 1. It is assumed that the client terminal is connected to the server through connection with the wireless communication section via the base station or the access point, as in the case described above.

Figure 4:
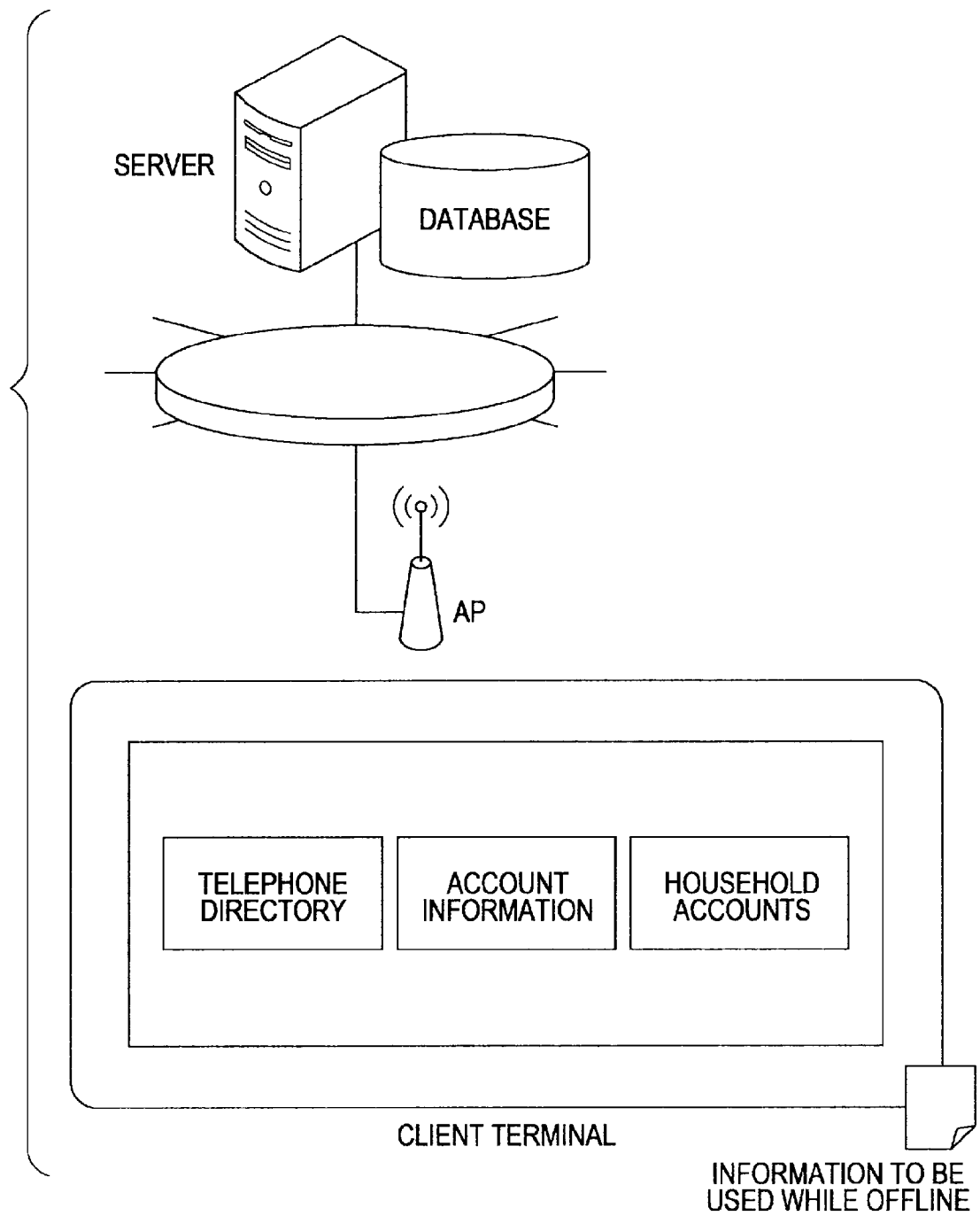
FIG. 4 illustrates the procedure for data exchange between the server and the client terminal in the communication system shown in FIG. 1.
Figure 5:
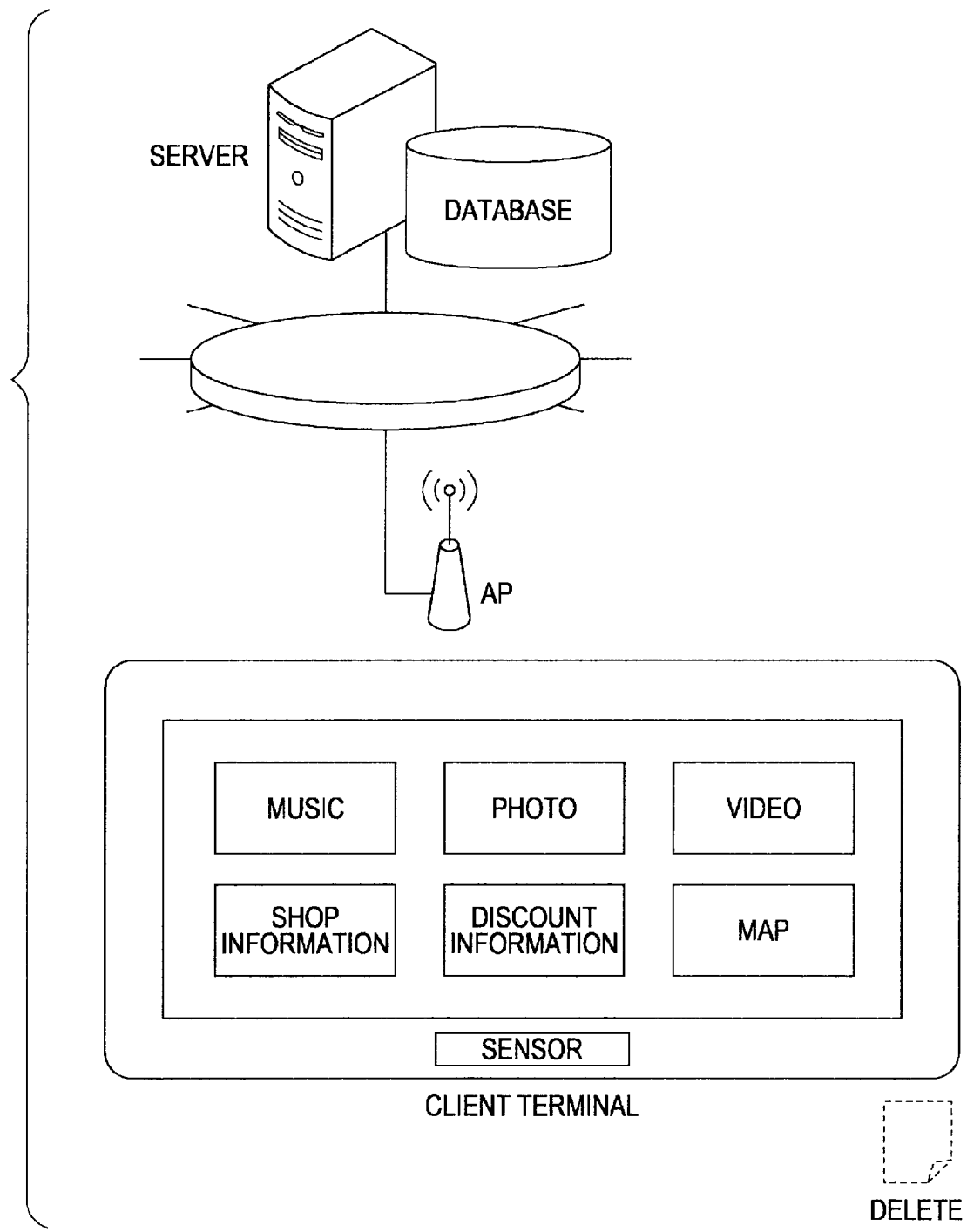
FIG. 5 illustrates the procedure for data exchange between the server and the client terminal in the communication system shown in FIG. 1.

In the procedure illustrated in FIGS. 2 to 4, the information to be used while the client terminal is offline is transmitted from the server to the client terminal. In contrast, in the procedure illustrated in FIGS. 10 to 13, the information to be used while the client terminal is offline is held encrypted in the client terminal, and the server supplies a common key for decryption to the client terminal before it goes offline so that the offline client terminal can use the information.

Figure 10:
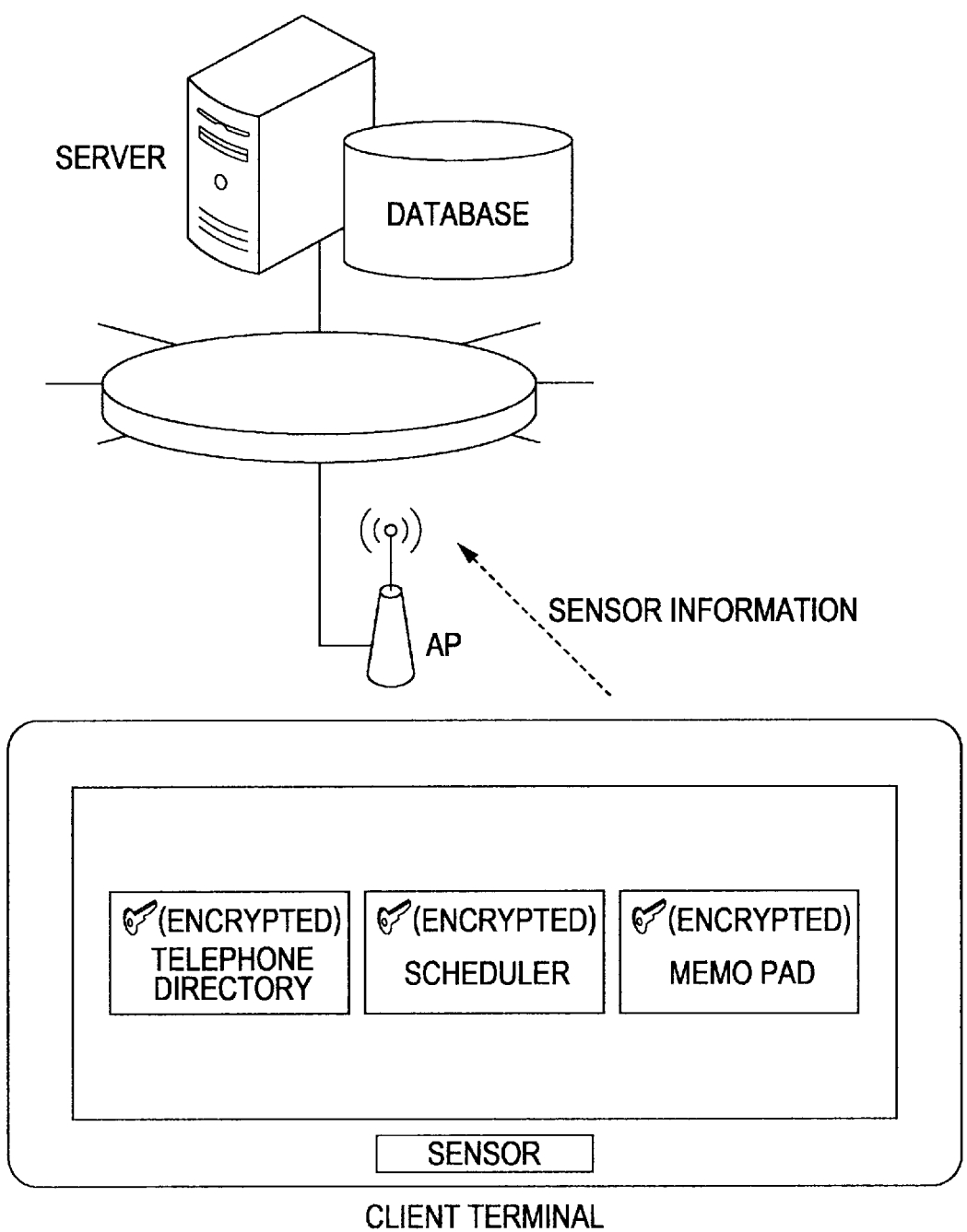
FIG. 10 illustrates an alternative example of a procedure of data exchange performed between the server and the client terminal in the communication system shown in FIG. 1.

When the user logs in to the client terminal, the client terminal transmits sensor information, obtained from the sensor in the client terminal and used for position recognition, to the server (see FIG. 10).

Personal information (such as a telephone directory, a scheduler, and a memo pad) to be used while the client terminal is offline is held encrypted in the client terminal (see FIG. 7). While online, however, since the common key for decryption is not supplied from the server, the personal information held in the client terminal is not usable. While online, the personal information stored in the server can be operated by the client terminal.

The server estimates the current position or the movement state of the client terminal on the basis of the sensor information received from the client terminal. Subsequently, on the basis of the contents analysis algorithm, the server analyzes the contents of the client-terminal private content, stored in the internal database, to predict a destination to which the client terminal moves from now. Next, on the basis of the movement prediction algorithm, the server then determines the client-terminal movement path from the current position to the destination. On the basis of the communication prediction algorithm, the server compares the predicted movement prediction information (the destination and the movement route) with the communication information, such as reception radio-wave strengths of access points, to thereby determine whether or not an offline area exists on the movement path of the client terminal.

Upon determining that an offline area exists on the movement path of the client terminal, the server determines the offline prediction position or offline prediction time at which the client terminal reaches the offline area and also determines the online return prediction position or online return prediction time at which the client terminal returns from the offline area to an online area. Before the client terminal goes offline, the server also transmits a common key for decrypting the encrypted personal information (see FIG. 11).

Upon reaching the offline area, the client terminal decrypts the personal information, held encrypted, by using the received common key. Thus, even with the client terminal being offline, the user can perform processing, such as reference, edit, and deletion, on the user information, such as a telephone directory, a scheduler, and a memo pad (see FIG. 12). In addition, since it is sufficient for the server to only transmit the common key to enable the client terminal to use the information to be used when it is offline, it is possible to reduce the amount of information transmitted, compared to a case in which information itself is transmitted as in the procedure illustrated in FIGS. 2 to 4.

When the client terminal reaches the online return prediction position at which it returns from the offline area to an online area or the online return prediction time is reached, the server attempts to connect to the client terminal. When the connection succeeds, the server issues, to the client terminal, a request for re-encrypting the personal information and deleting the common key transmitted before the client terminal went offline.

Figure 13:
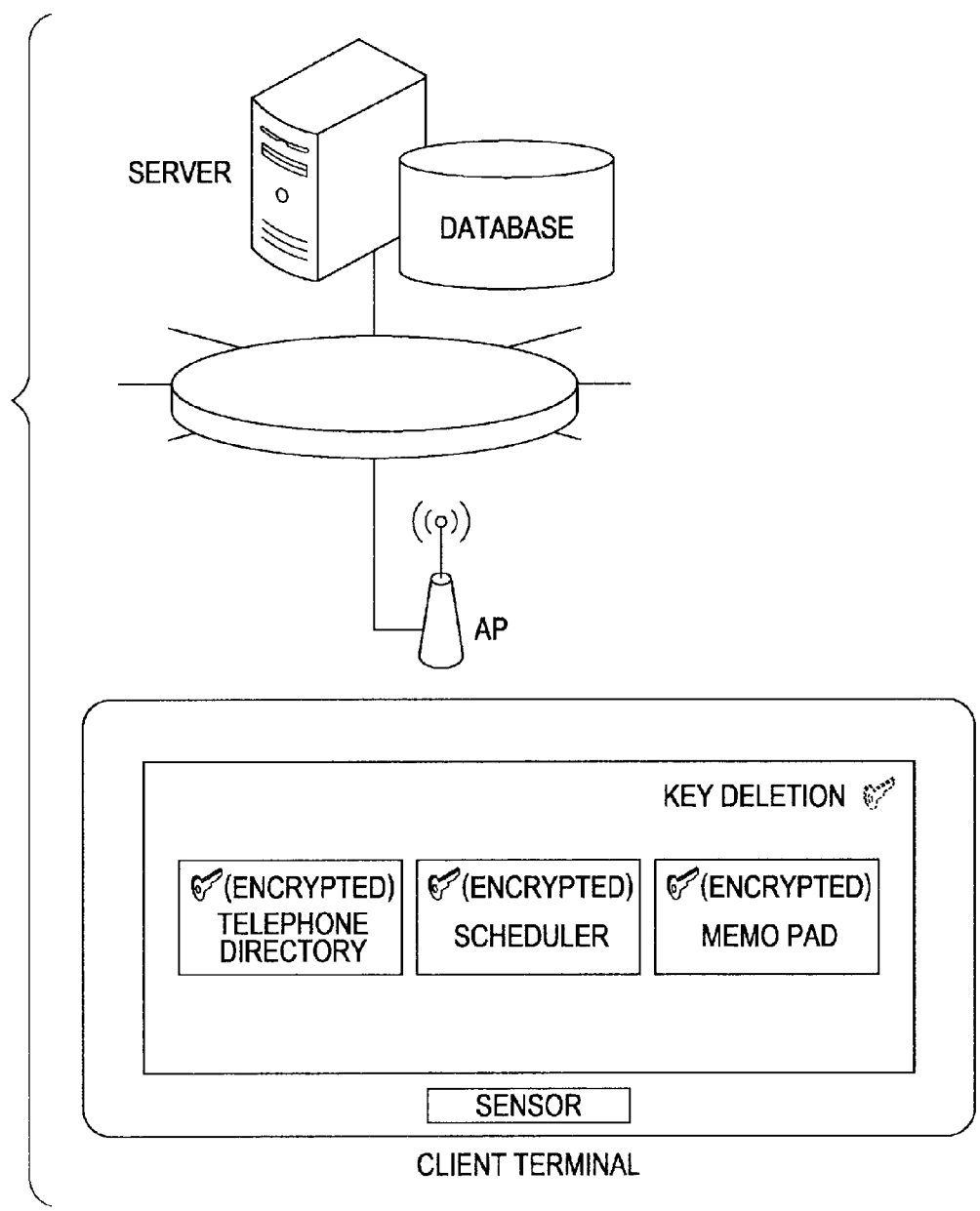
FIG. 13 illustrates the alternative example of the procedure of data exchange performed between the server and the client terminal in the communication system shown in FIG. 1.

In response to the request from the server, the client terminal re-encrypts the personal information with the common key and then deletes the common key, when it goes online (see FIG. 13). After the processing, the user can perform online operations, such as reference, edit, and deletion, on various types of user information stored in the server.

In the data exchange procedure illustrated in FIGS. 10 to 13, for example, a method employing public-key cryptography may be used in order to safely transfer the common key from the server to the client terminal.

First, the server encrypts the personal information with the common key and transfers the encrypted personal information to the client terminal in advance (see FIG. 10). The client terminal generates a pair of a public key and a private key for encrypting and decrypting the common key transferred from the server.

Figure 11:
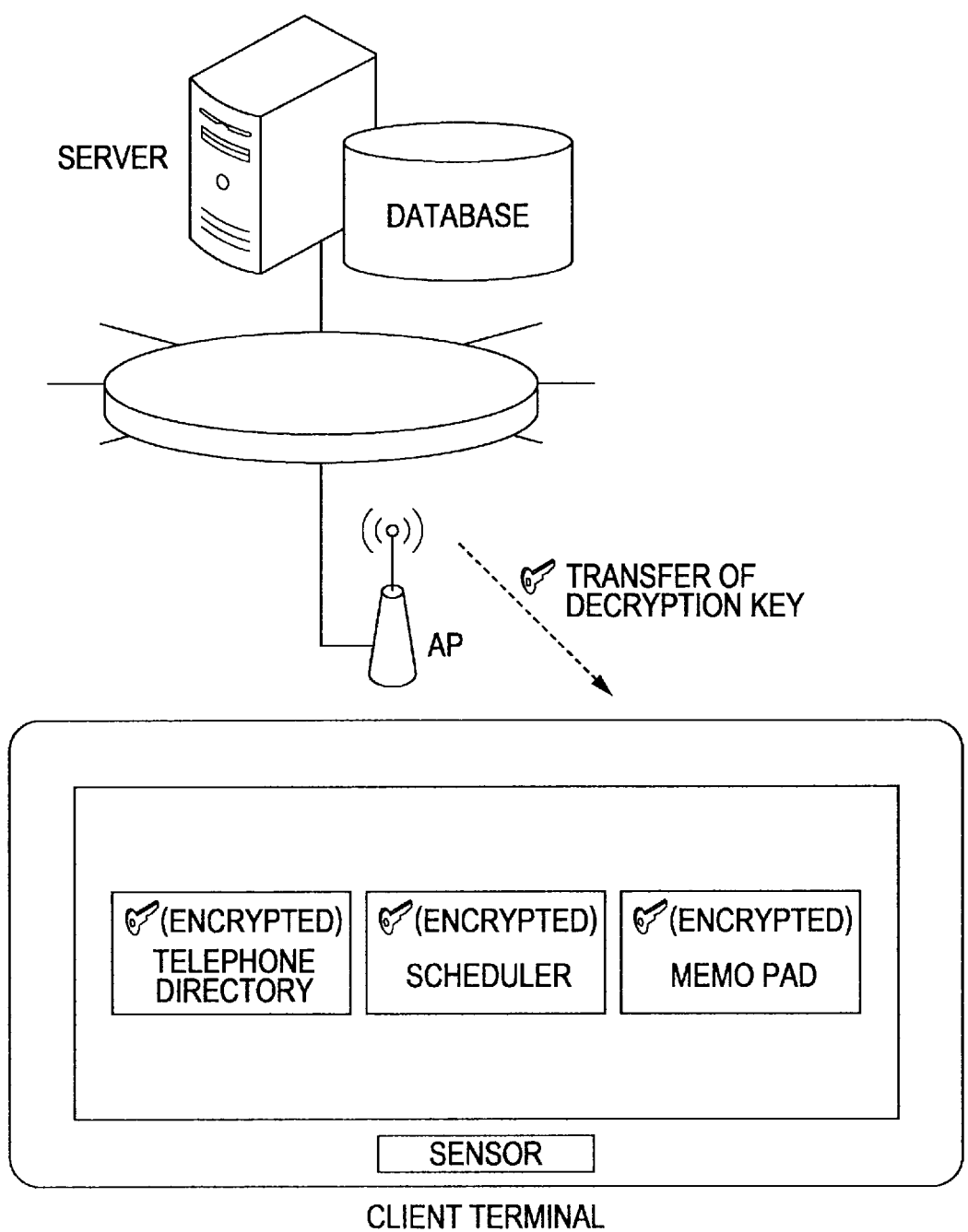
FIG. 11 illustrates the alternative example of the procedure of data exchange performed between the server and the client terminal in the communication system shown in FIG. 1.
Figure 12:
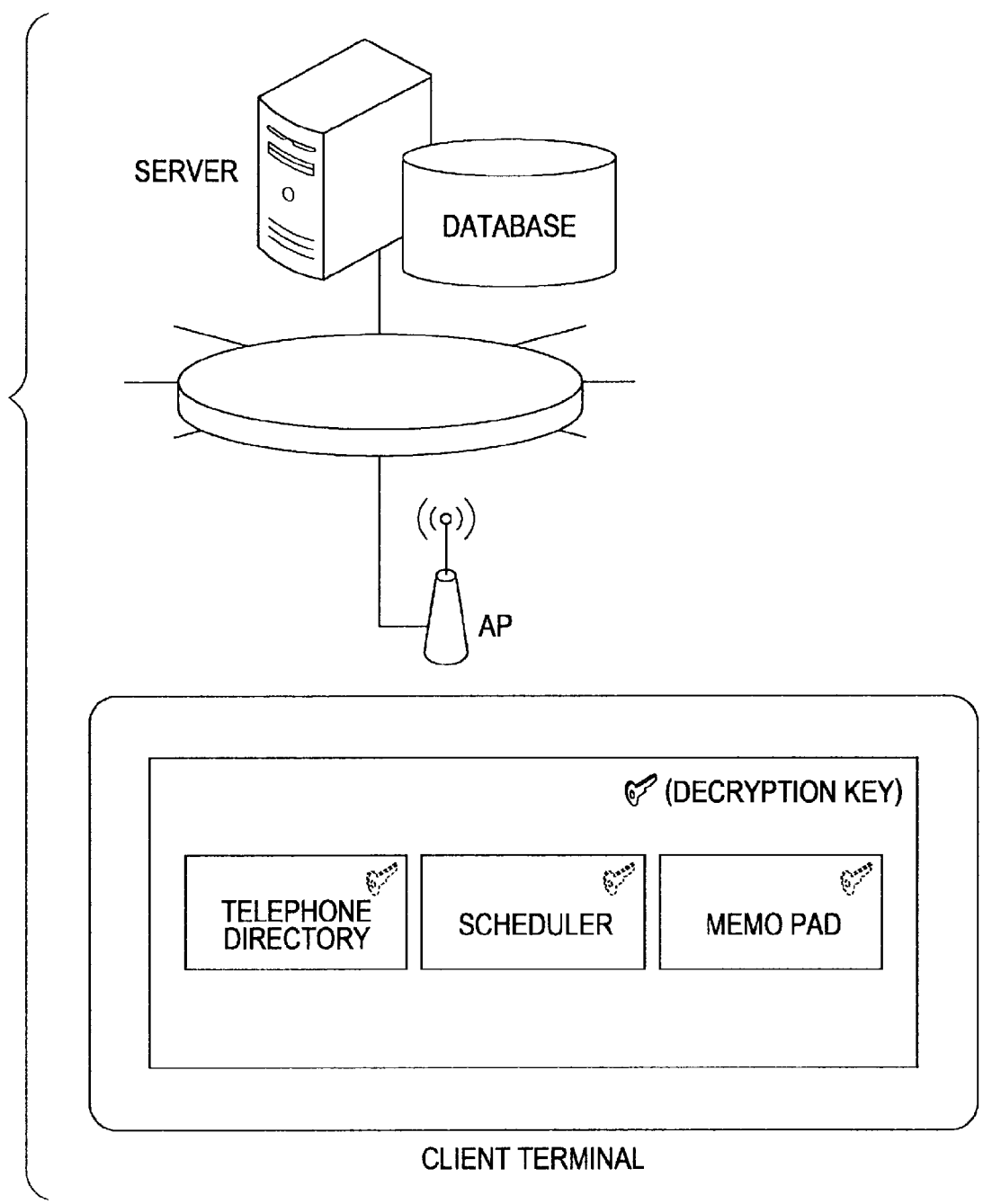
FIG. 12 illustrates the alternative example of the procedure of data exchange performed between the server and the client terminal in the communication system shown in FIG. 1.

Upon determining that the client terminal is reaching an offline area, the server encrypts the common key with the public key and transfers the encrypted common key to the client terminal (see FIG. 11). The client terminal decrypts the encrypted common key with the private key and decrypts the data encrypted with the common key (see FIG. 12).

Since the server automatically transfers the common key to the client terminal upon predicting that the client terminal reaches an offline area, as described above, the data can be referred to, edited, and deleted with the client terminal being offline. In addition, since only the keys are transferred between the server and the client terminal, the amount of information transmitted is smaller than the amount of information transmitted when the data itself is transmitted.

Thereafter, when the client terminal reaches the online return prediction position at which it returns from the offline area to an online area or the online return prediction time is reached, the server attempts to connect to the client terminal. When the connection succeeds, the server issues, to the client terminal, a request for re-encrypting the personal information and deleting the common key transmitted before the client terminal went offline.

In response to the request from the server, the client terminal re-encrypts the personal information with the common key and then deletes the common key, when it goes online (see FIG. 13). After the processing, the user can perform online operations, such as reference, edit, and deletion, on various types of user information stored in the server. With the client terminal being online, the personal information in the server can be operated but the personal information held in the client terminal is encrypted and is thus inoperable. Since the personal information to be used while the client terminal is offline is held encrypted in the client terminal, the risk of information leakage resulting from, for example, loss of the client terminal can be reduced.

Since a detailed system for the public-key cryptography is disclosed in numerous documents including U.S. Pat. No. 4,405,829, a description thereof is not given herein.

Figure 14A:
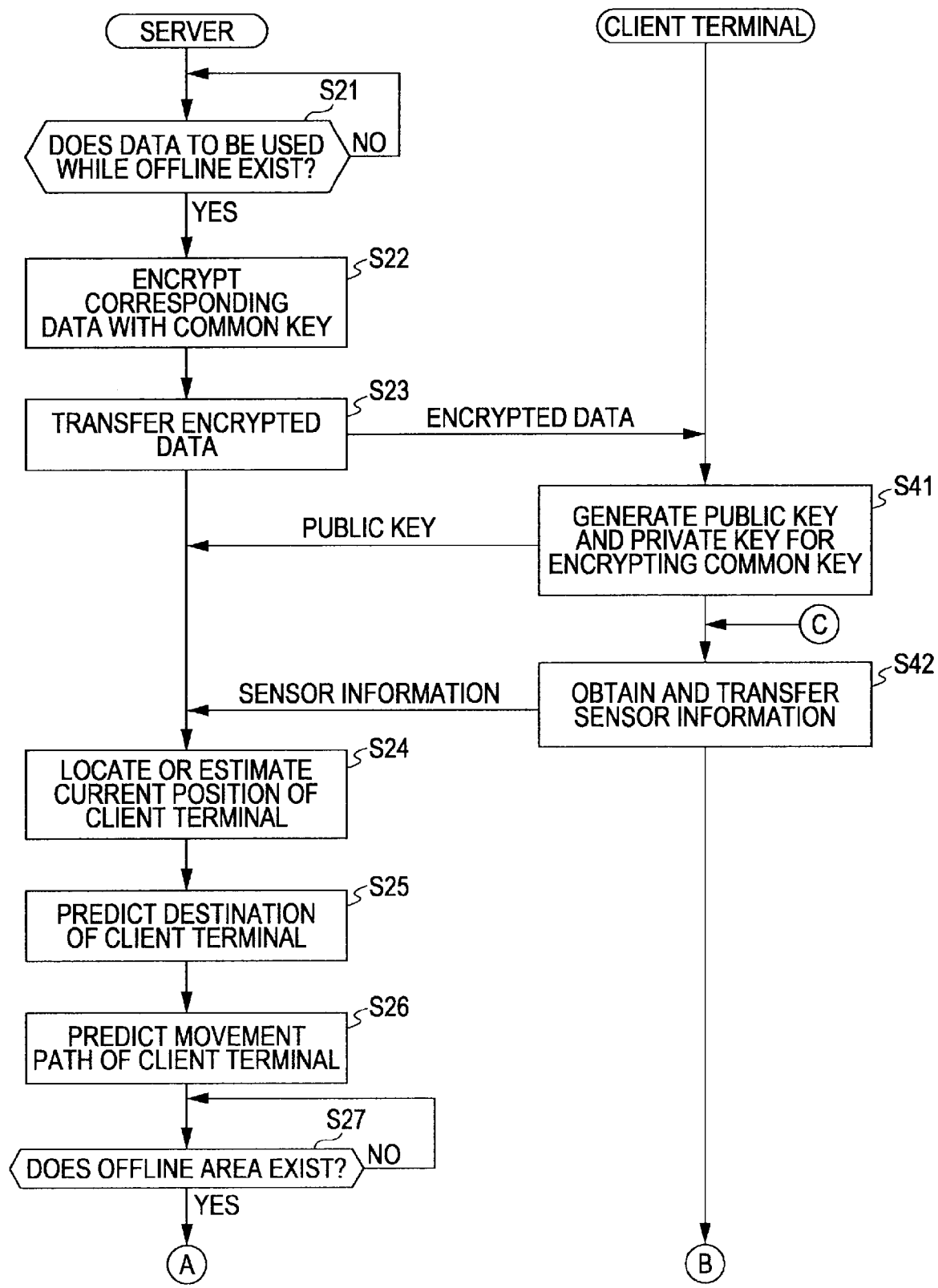
FIG. 14A is a flowchart (a first half part) of processing procedures, executed by the server and the client terminal, for realizing the data exchange procedure illustrated in FIGS. 10 to 13.
Figure 14B:
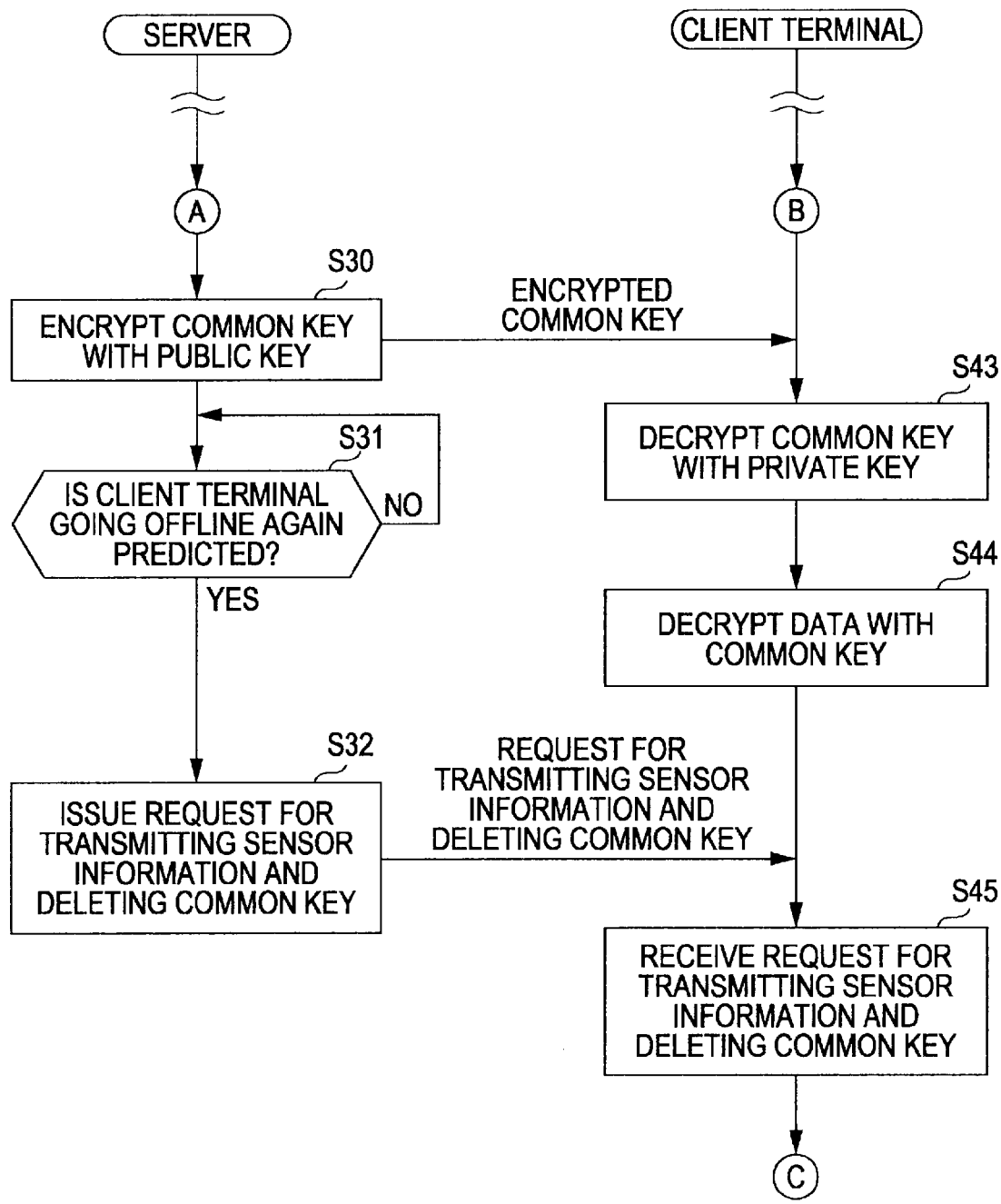
FIG. 14B is a flowchart (a last half part) of processing procedures, executed by the server and the client terminal, for realizing the data exchange procedure illustrated in FIGS. 10 to 13.

FIGS. 14A and 14B are flowcharts of processing procedures, executed by the server and the client terminal, for realizing the data exchange procedure illustrated in FIGS. 10 to 13. In the illustrated processing procedures, it is assumed that public-key cryptography is used in order to safely transfer the common key.

First, in step S21, the server refers to the private content database to check whether or not the data to be used by a corresponding user while offline exists. The data to be used while offline is, for example, the user's personal information, such as a telephone directory, a scheduler, and a memo pad, as described above.

When data to be used by the user while offline exists (YES in step S21), the server encrypts the data with a predetermined common key in step S22. In step S23, the server transfers the encrypted data to the client terminal to which the user logged in.

In turn, upon receiving the encrypted data from the server, the client terminal generates a pair of a public key and a private key for encrypting and decrypting the common key transferred from the server and transfers the public key thereof to the server in step S41.

In step S42, the client terminal transmits sensor information, obtained from the sensor in the client terminal and used for position recognition, at predetermined intervals.

Upon receiving the sensor information from the client terminal, in step S24, the server locates or estimates the current position of the client terminal on the basis of sensor information stored in the sensor-information database.

Next, in step S25, on the basis of the contents analysis algorithm, the server analyzes the contents of the client-terminal private content (e.g., text information of a schedule, mail, and a memo pad, and information of photographed images), stored in the private content database (described below), to predict a destination to which the client terminal moves from now.

Next, in step S26, on the basis of the movement prediction algorithm, the server determines the movement path of the client terminal from the current position, located or estimated based on the sensor information, to the predicted destination.

As described above, the server has the communication information database that stores communication information previously transmitted from the client terminals, and keeps track of communication states (e.g., transfer rates and radio-wave strengths in the service areas of distributed access points) of multiple wireless systems with respect to times and locations. Upon obtaining the movement path of the client terminal in step S26, the server further estimates future communication information of the client terminal on the basis of the communication prediction algorithm. That is, in step S27, the server determines whether or not an offline area exists on the predicted movement path, by comparing predicted movement prediction information (a destination and a movement route) with communication information such as the reception radio-wave strengths of the access points.

When the server determines that an offline area exists on the predicted movement path (YES in step S27), the process proceeds to step S30 in which the server encrypts the common key, generated in step S22, with the public key received from the client terminal and transfers the encrypted common key to the client terminal. The server then terminates the connection with the client terminal that is determined to be offline.

In response, in step S43, the client terminal decrypts the common key, received from the server, with the private key generated in step S41. In step S44, the client terminal uses the decrypted common key to decrypt the encrypted data pre-transferred from the server. Thus, even with the client terminal being offline, the user can perform processing, such as reference, edit, and deletion, on the user information, such as a telephone directory, a scheduler, and a memo pad (see FIG. 12).

The server determines the online return prediction position or the online return prediction time by comparing the predicted movement prediction information (the destination and the movement route) with the communication information such as the reception radio-wave strengths of access points. When the server predicts that the client terminal is going online again (YES in step S31), the process proceeds to step S32 in which the server resumes the connection with the client terminal and issues, to the client terminal, a request for transmitting the sensor information and deleting the common key transmitted before the client terminal went offline.

In turn, upon going online again, the client terminal resumes the connection with the server. In step S45, the client terminal receives, from the server, the request for transmitting the sensor information and deleting the common key, and then deletes the common key. Then, the process returns to step S42 in which the client terminal transmits the sensor information. Thereafter, the server and the client terminal repeatedly execute processing that is similar to that described above.

As described above, according to the processing procedures illustrated in FIGS. 9, 14A, and 14B, even with the client terminal being offline, the user can operate the information to be used while offline. Also, when the client terminal goes online again, the personal information used while offline is deleted or the information is re-encrypted and the encryption key is deleted. This can reduce the risk of leakage of the personal information from the client terminal lost when it is offline.

Figure 15:
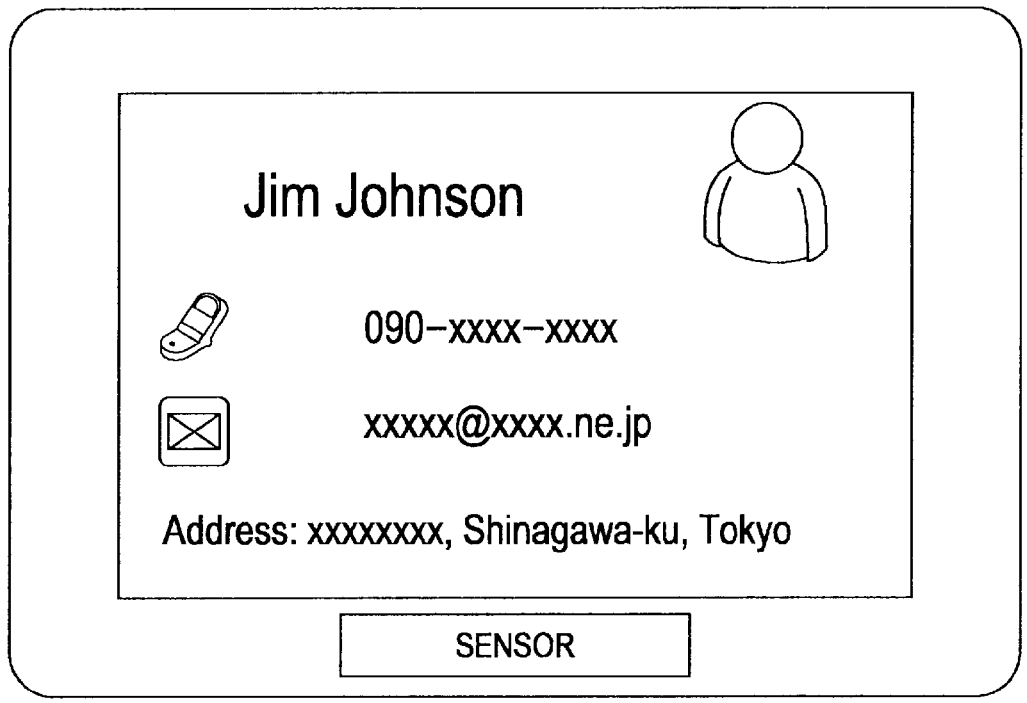
FIG. 15 shows an example of display of personal information on the client terminal while online.
Figure 16:
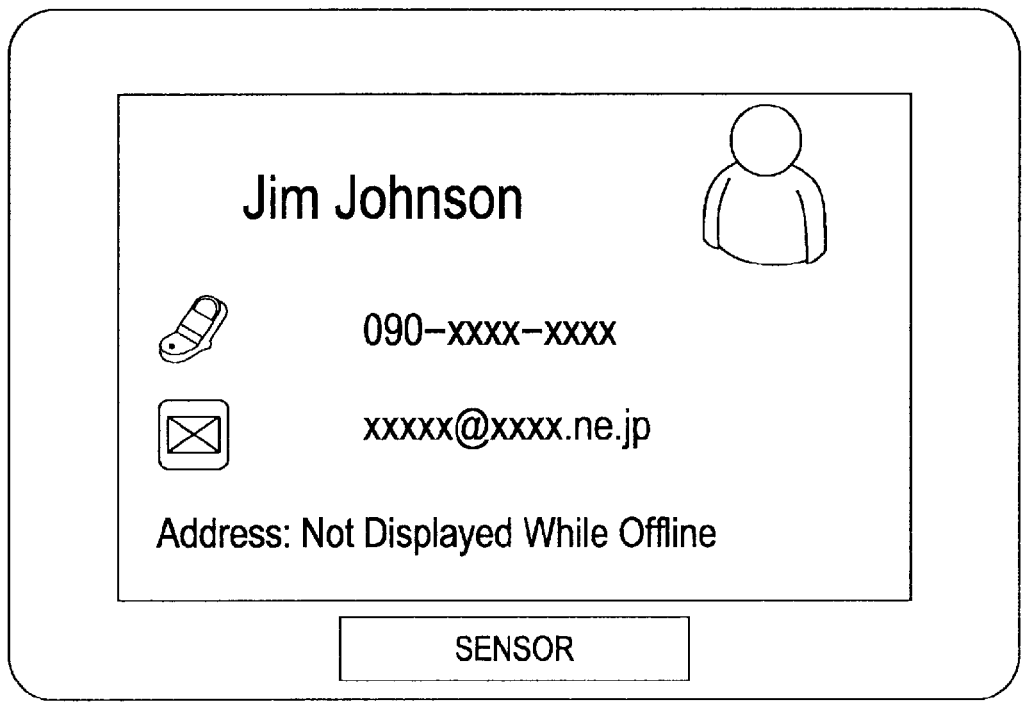
FIG. 16 shows an example of display of personal information on the client terminal while offline.

In order to further reduce the risk of information leakage while offline, display of the personal information while offline may be further restricted than while online. FIG. 15 illustrates an example of display of the personal information on the client terminal while online. In the illustrated example, the personal information is a telephone directory, and the postal address of a registered person is displayed as well as his/her name, telephone number, and email address. FIG. 16 illustrates an example of display of the personal information on the client terminal while offline. In the illustrated example, although the name, telephone number, and email address of the registered person are displayed, his/her postal address is not displayed. For example, in step S7 in the flowchart illustrated in FIG. 9, the server may perform the transfer or synchronization processing on limited part in a range permitted for display, as illustrated in FIG. 16, rather than transmitting all of the data determined to be preferentially subjected to the transfer or synchronization processing.

Figure 17:
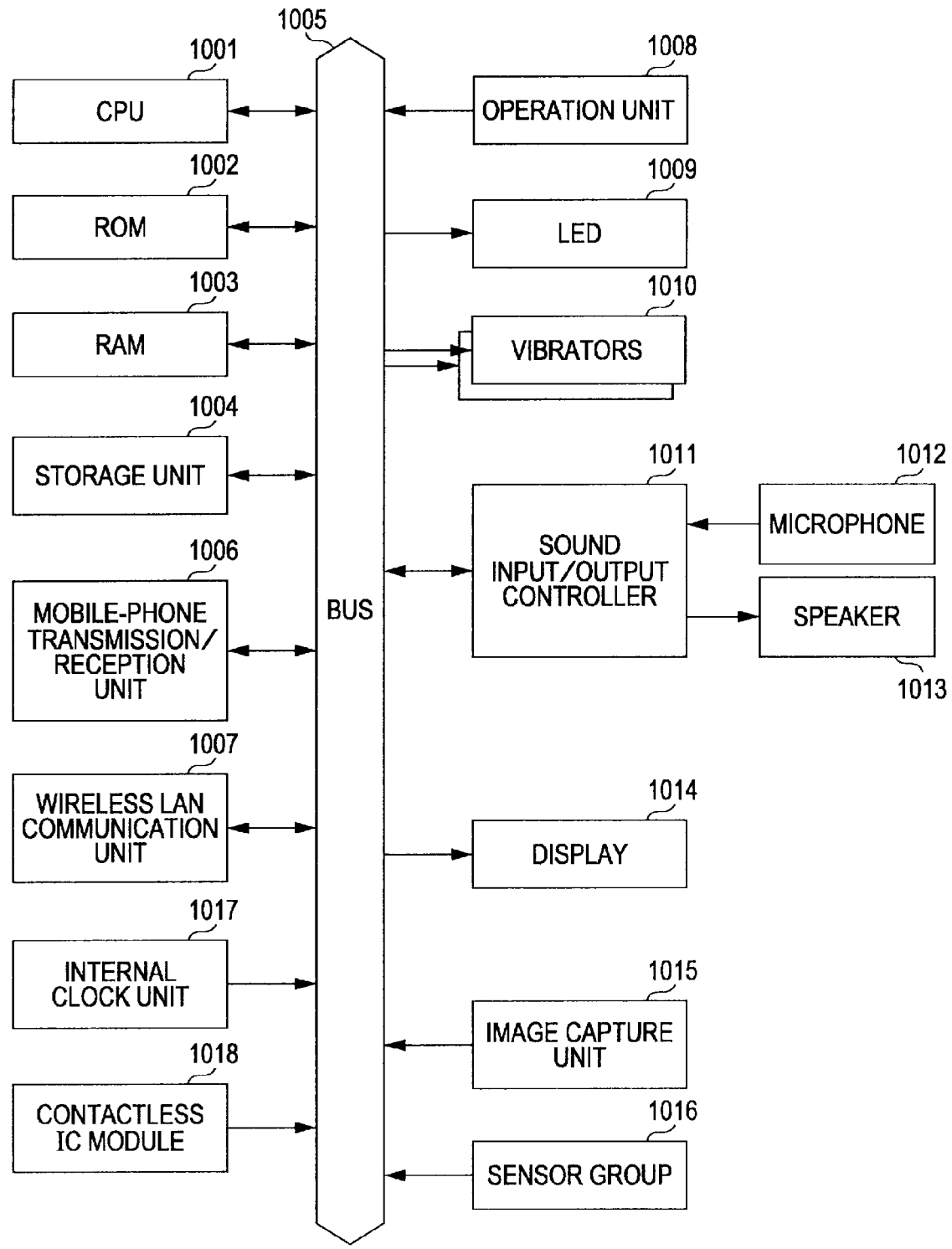
FIG. 17 shows an example of the configuration of information equipment that operates as a user client terminal.

FIG. 17 illustrates an example of the configuration of information equipment that operates as the user client terminal. One example of the information equipment is a mobile phone.

A CPU (central processing unit) 1001 controls operations of individual units of the information equipment to execute various types of processing in accordance with a program stored in a ROM (read only memory) 1002 or a program loaded from a storage unit 1004 to a RAM (random access memory) 1003. The RAM 1003 stores, for example, data that the CPU 1001 uses to execute various types of processing, as appropriate.

The CPU 1001, the ROM 1002, and the RAM 1003 are interconnected through a bus 1005. The storage unit 1004, a mobile-phone transmission/reception unit 1006, a wireless LAN communication unit 1007, an operation unit 1008, an LED (light emitting diode) 1009, vibrators 1010, a sound input/output controller 1011, a microphone 1012, a speaker 1013, a display 1014, an image capture unit 1015, a sensor group 1016, an internal clock unit 1017, and a contactless IC (integrated circuit) module 1018 are further connected to the bus 1005. The information equipment can photograph a moving image and a still image by using the image capture unit 1015.

The mobile-phone transmission/reception unit 1006 can operate as a fully functional cellular radio transmission/reception device in accordance with any of available standards, including a W-CDMA or LTE standard.

The wireless LAN communication unit 1007 can operate in accordance with a general wireless LAN standard, such as Wi-Fi or WiMAX. In the present embodiment, the wireless LAN communication unit 1007 performs an intermittent reception operation in a power-save mode during passive scanning and also can completely stop a communication function in accordance with an instruction from the CPU 1001.

The operation unit 1008 includes buttons, a jog dial, and so on to receive an operation from a user. Examples of the user operation include character inputting, such as creating email and filling in a schedule, as well as entering a telephone number and performing various settings. The LED 1009 emits light, for example, to draw the attention of the user to the information equipment while information is presented to the user. The vibrators 1010 vibrate the main body of the information equipment in order to draw the attention of the user, for example, when there is an incoming mail or call.

The microphone 1012 converts voice of the user into electrical audio signals and the speaker 1013 converts audio signals into audible signals that can be heard by the user. The sound input/output controller 1011 supplies basic analog output signals to the speaker 1013 and also receives analog audio input from the microphone 1012.

When the information equipment is used as a general mobile phone, the display 1014 enables an operator to view dialed numerals, an image, an incoming-call status, a menu/option, and other types of service information. During photography using the image capture unit 1015, the display 1014 can be used to display, playback, or output a live image or a photographed image.

The image capture unit 1015 includes an optical system, an image sensor, and an image processor (which are not shown). The optical system includes a single lens or multiple lenses to form an image, and the image sensor captures the image. The image processor processes compressed image data or raw image data, obtained by the image sensor, for storage in the storage unit 1004, for output on the display 1014, or for transmission through the mobile-phone transmission/reception unit 1006 or the wireless LAN communication unit 1007. The image captured by the image capture unit 1015 is private content. The image captured by the image capture unit 1015 may also be subjected to image recognition so that the resulting information can be used as the sensor information for estimating the movement state of the client terminal.

In the present embodiment, the sensor group 1016 may include one or more sensors that are capable of obtaining sensor information that is usable for position recognition. Examples of such a sensor include a GPS module, an acceleration sensor module, and a geomagnetic sensor module.

The internal clock unit 1017 supplies time information, such as current time, to the system. The arrival of the offline prediction time and the online return prediction time can be estimated based on the information of time measured by the internal clock unit 1017.

The contactless IC module 1018 is a near-field IC module that complies with, for example, ISO/IEC (International Organization for Security/International Electrotechnical Commission) 14443, such as FeliCa (registered trademark), and can be used for authentication processing and billing processing. Transportation/trip history or purchase history can be obtained from the contactless IC module 1018.

Figure 18:
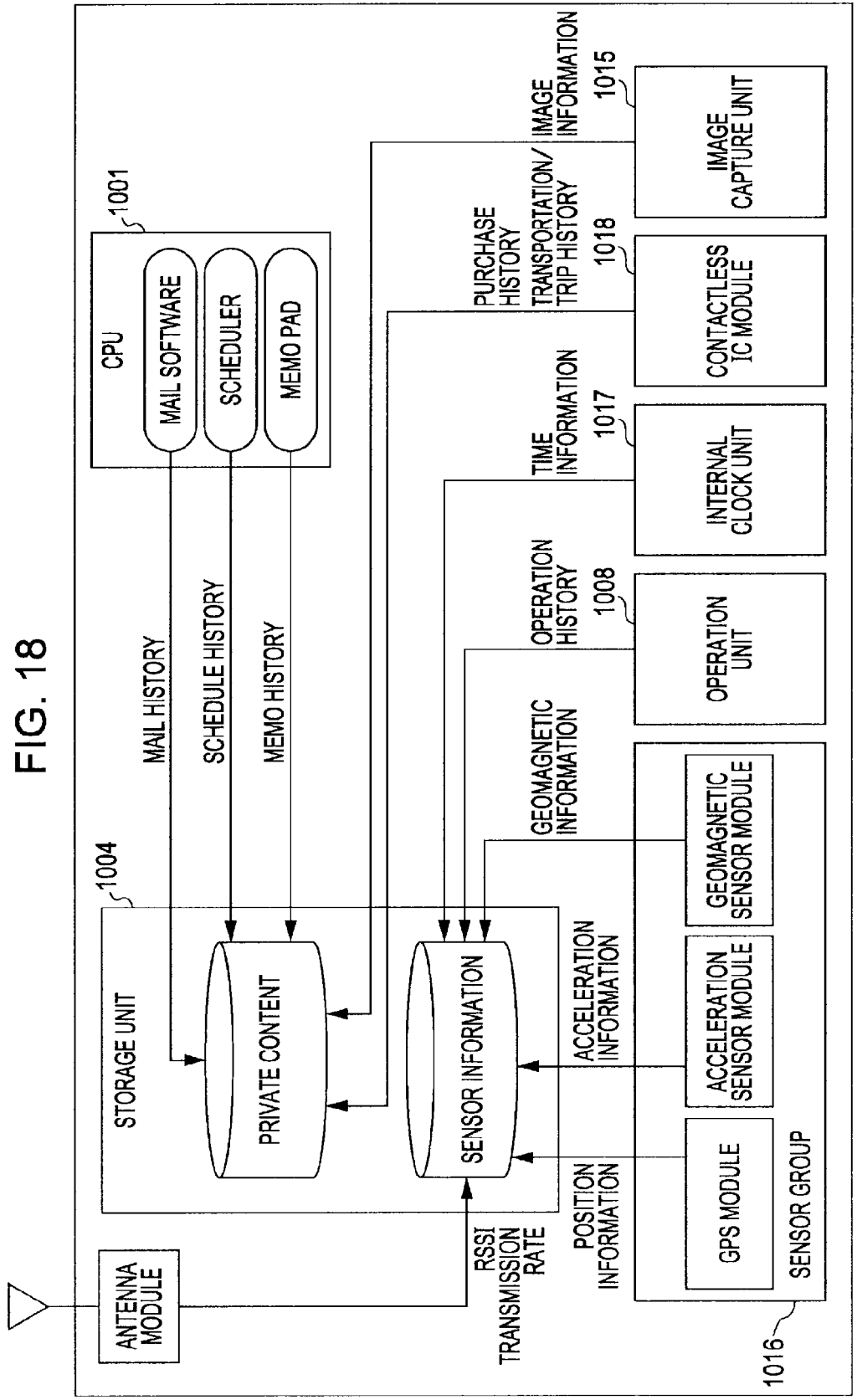
FIG. 18 schematically illustrates a functional configuration for allowing the client terminal to transmit private content and sensor information.

In the present embodiment, the information equipment (see FIG. 17) has a function for transmitting private content and sensor information to the server in order to realize cooperative operation with the server (as illustrated in FIGS. 9, 14A, and 14B) during operation as the client terminal. FIG. 18 schematically illustrates a functional configuration for allowing the client terminal to transmit the private content and the sensor information.

Examples of the private content include mail history, schedule history, and memo history resulting from applications, such as mail software, a scheduler, and a memo pad, executed by the CPU 1001. In addition, the private content may include action history, such as a user login ID, login date and time, a login location, logoff date and time, a logoff location, transportation/trip history, information of an image photographed by the image capture unit 1015, billing information such as purchase history and transportation/trip history resulting from the contactless IC module 1018, and action history such as operation history of various types of equipment. The private content is stored in the storage unit 1004 and is transferred to the server at arbitrary time when the client terminal goes online.

The sensor information is measured by the sensor group 1016 and includes one ore more pieces of information that are usable for position recognition. Examples of the sensor information include position information obtained by the GPS module, acceleration information obtained by the acceleration sensor module, and geomagnetic information obtained by the geomagnetic sensor module. Further examples of the sensor information include history of operations performed by the user on the operation unit 1008 and information of time measured by the internal clock unit 1017. Alternatively, the sensor information may include sensor information, such as acceleration information obtained by the acceleration sensor or a result of image recognition of an image captured by the image capture unit 1015, for estimating the movement state of the client terminal.

Communication information, such as a transfer rate and a reception radio-wave strength, can also be used for position recognition. Thus, the sensor information may include a transfer rate obtained by an antenna module including the mobile-phone transmission/reception unit 1006, the wireless LAN communication unit 1007, and so on and a reception radio-wave strength of a base station or an access point.

Those pieces of sensor information are stored in the storage unit 1004. After the user logs in to the client terminal, the sensor information is transferred online to the server at predetermined intervals.

Figure 19:
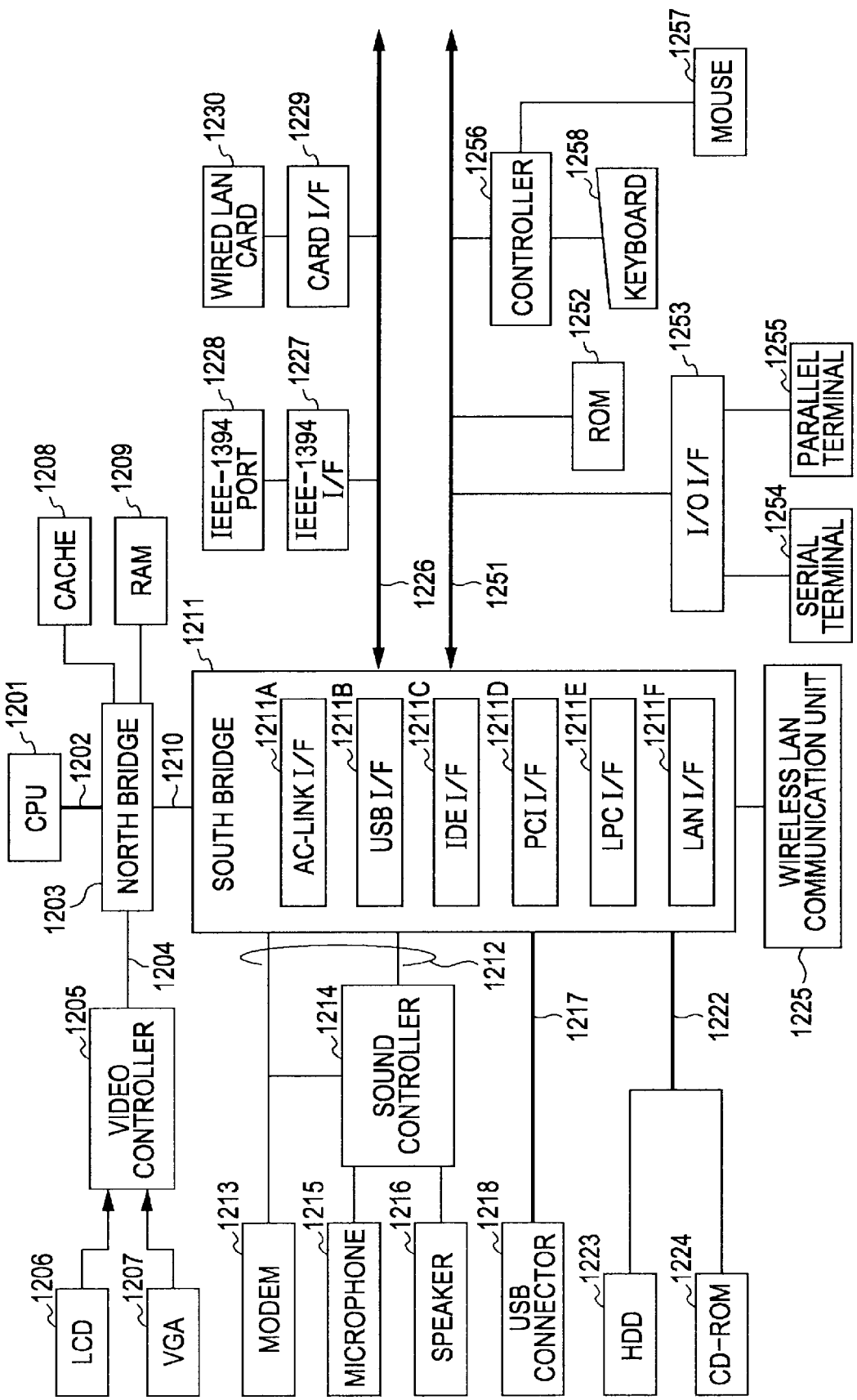
FIG. 19 shows an example of the configuration of information equipment that operates as a server.

FIG. 19 illustrates an example of the configuration of information equipment that operates as the server. The server can be realized, for example, by launching a predetermined server application on a typical calculation system, such as a personal computer.

A CPU 1201 executes various application programs under an execution environment provided by an operating system (OS). The operating system is a computer-basic-operation controlling program typified by Windows (registered trademark) XP of Microsoft Corporation or Mac OS (registered trademark) of Apple Computer Inc.

The CPU 1201 is connected to a front side bus (FSB) 1202, which is further connected to a north bridge 1203. The north bridge 1203 has an AGP (accelerated graphics port) 1204 and a hub interface (I/F) 1210.

The north bridge 1203 is connected to a cache memory 1208 and a RAM 1209, which serves as a main memory, and controls operations for accessing the memory devices. The RAM 1209 is implemented by, for example, a DRAM (dynamic RAM) and stores a program executed by the CPU 1201 and work data used for operation of the CPU 1201. The cache memory 1208 is implemented by a memory device, such as an SRAM (static RAM), that is capable of executing a higher-speed writing or reading operation, and caches (i.e., temporarily stores) a program or data used by the CPU 1201.

The north bridge 1203 is connected to a video controller 1205 through the AGP 1204. The video controller 1205 generates image data corresponding to data received from the CPU 1201 or directly stores image data, received from the CPU 1201, in a video memory (not shown) provided in the video controller 1205, and also causes an LCD (liquid crystal display) 1206 or a VGA (video graphics array) controller 1207 to display an image corresponding to the image data in the video memory. The LCD 1206 or the VGA controller 1207 displays an image, characters, or the like on the basis of the data supplied from the video controller 1205. The VGA controller 1207 in this case may be a VGA display.

The north bridge 1203 is also interconnected with a south bridge 1211 through the hub interface 1210. The south bridge 1211 includes an AC-link interface 1211A, a USB (universal serial bus) interface 1211B, an IDE (integrated drive electronics) interface 1211C, a PCI (peripheral component interconnect) interface 1211D, an LPC (low pin count) interface 1211E, a LAN interface 1211F, and so on. The south bridge 1211 controls input/output operations and so on of various devices connected to an AC-link bus 1212, a USB bus 1217, and an IDE bus 1222.

A modem 1213, a sound controller 1214, and so on are connected to the AC-link bus 1212. The sound controller 1214 receives audio from a microphone 1215, generates data corresponding to the audio, and outputs the generated data to the RAM 1209. The sound controller 1214 drives a speaker 1216 to cause it to output sound.

A USB connector 1218 is connected to the USB bus 1217 and various USB devices are connectable thereto. The USB interface 1211B transmits data to a USB device (not shown) connected via the USB bus 1217 and also receives data from the device.

The IDE interface 1211C includes, for example, two IDE controllers, constituted by a primary IDE controller and a secondary IDE controller, and a configuration register (neither of which is shown). A HDD (hard disk drive) 1223 is connected to the primary IDE controller through the IDE bus 1222. An IDE device, such as a CD-ROM drive 1224 or a HDD (not shown), is attached to the secondary IDE controller.

Various application programs executed by the CPU 1201 are installed on the HDD 1223. Various types of data and content can also be stored on the HDD 1223. In the present embodiment, the communication-information database, the sensor-information database, and the private content database are constructed using the HDD 1223.

A wireless LAN communication unit 1225 is connected to a network through wireless LAN communication such as communication based on IEEE 802.11a/b. The LAN interface 1211F transmits data to the network connected to the wireless LAN communication unit 1225 and also receives data therethrough. The calculation system that operates as the server may be adapted to perform processing, such as information transfer and synchronization with the client terminal through a wireless LAN.

A ROM (read only memory) 1252, an I/O (input/output) interface 1253, and a controller 1256 are connected to an LPC bus 1251. The ROM 1252 stores a BIOS (basic input/output system) and so on. The BIOS includes basic input/output instructions to control input/output of data between the OS or application programs and peripherals.

A serial terminal 1254 and a parallel terminal 1255 are connected to the I/O interface 1253. The I/O interface 1253 performs serial input/output and parallel input/output of data to/from equipment connected to the corresponding terminals 1254 and 1255. User input devices, such as a mouse 1257 and a keyboard 1258, are connectable to the controller 1256.

A card interface 1229, an IEEE-1394 interface 1227, and another PCI device (not shown) are connected to a PCI bus 1226. The card interface 1229 supplies data, supplied from an expansion card connected to a card slot (not shown), to the CPU 1201 or the RAM 1209 and also outputs data, supplied from the CPU 1201, to the expansion card connected to the card slot. On example of the expansion card is a wired LAN card 1230. When the illustrated information equipment operates as the server, it performs processing such as information transfer or synchronization with the client terminal via the wired LAN card 1230. The IEEE 1394 interface 1227 transmits/receives IEEE-1394-standard-compliant data (packetized data) via an IEEE-1394 port 1228.

Figure 20:
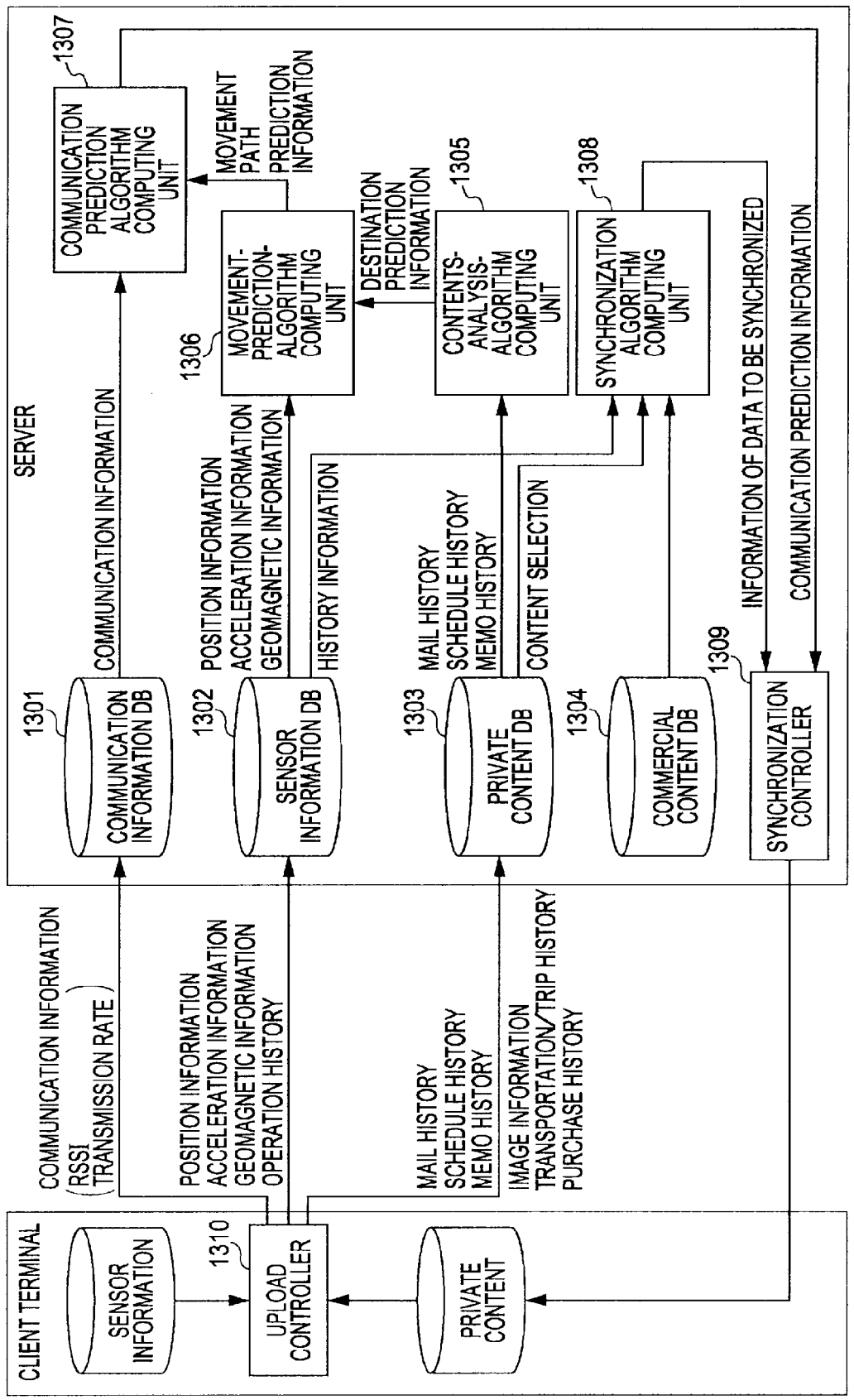
FIG. 20 schematically shows a functional configuration for allowing the server to provide communication prediction information through a cooperative operation with the client terminal.

In the present embodiment, when the information equipment (see FIG. 19) operates as the server, it receives communication information, private content, and sensor information from the client terminal and transmits communication prediction information to the client terminal in transit. FIG. 20 schematically illustrates a functional configuration for the server to provide communication prediction information through a cooperative operation with the client terminal.

The server has a communication information database (DB) 1301, a sensor information database 1302, a private content database 1303, and a commercial content database 1304. These databases are constructed using the HDD 1223.

The communication information database 1301 stores communication information, such as transfer rates and reception radio-wave strengths, previously transmitted from multiple client terminals. The present invention, however, is not limited to a method for constructing the communication information database on the basis of the communication information collected from the client terminals, and thus, the communication information database may be constructed by another method. On the basis of the communication information database 1301, the server can recognize communication states of multiple wireless systems with respect to times and locations, that is, transfer rates, radio-wave strengths, and so on in the service areas of distributed access points.

The sensor information database 1302 stores sensor information previously transmitted from the client terminals. The sensor information in this case includes sensor information that can be used for position recognition. Examples include position information obtained based on radio waves received by the GPS module provided in the client terminal, received-signal strength information (RSSI) of Wi-Fi base stations, and acceleration information obtained by the acceleration sensor. The server can locate or estimate the current position of each client terminal on the basis of the sensor information stored in the sensor information database 1302.

The private content database 1303 stores private content (e.g., text information of schedules, mail, memo pads, and so on, information of photographed images, purchase history, and transportation/trip history) previously transmitted from the client terminals. The server can analyze the contents of the private content stored in the database to predict, for example, the destination of the client terminal in transit. The application of the private content database, however, is not limited to the destination prediction.

The commercial content database 1304 stores content to be supplied to each user for free or for a fee on a commercial base. Examples of the content include music, photos, and videos. Similarly to the private content, the commercial content is also content to be subjected to the information transfer or synchronization processing with the client terminal.

As described above, the sensor information and the private content are stored in the storage unit 1004 in the client terminal. An upload controller 1310 is a functional module realized by, for example, the CPU 1001 executing a predetermined application program. The upload controller 1310 uploads communication information, such as a reception radio-wave strength and a transfer rate, to the communication information database 1301 of the server, uploads sensor information, such as position information, acceleration information, geomagnetic information, purchase history, and transportation/trip history, to the sensor information database 1302, and uploads private content, such as mail history, schedule history, memo history, purchase history, and transportation/trip history, to the private content database 1303.

The server has a contents-analysis-algorithm computing unit 1305, a movement-prediction-algorithm computing unit 1306, a communication-prediction-algorithm computing unit 1307, and a synchronization-algorithm computing unit 1308 in order to provide each client terminal with an information transfer or synchronization service during the online period and the offline period.

The contents-analysis-algorithm computing unit 1305 analyzes the contents of the client-terminal private content stored in the private content database 1303, predicts a destination to which the client terminal moves from now by using the contents analysis algorithm, and supplies the predicted destination prediction information to the movement-prediction-algorithm computing unit 1306.

The movement-prediction-algorithm computing unit 1306 uses the movement prediction algorithm to predict a movement route from the client-terminal current position, located or estimated based on the sensor information, to the destination, predicted by the contents-analysis-algorithm computing unit 1305, and supplies the predicted movement prediction information to the communication-prediction-algorithm computing unit 1307.

The movement-prediction-algorithm computing unit 1306 predicts how the client terminal moves from now in the case of the current location and the current time, by using the previous movement history of the user who is using the client terminal or the movement history of not only the corresponding user but also other users. As the prediction method, the movement-prediction-algorithm computing unit 1306 uses the movement history to determine the probabilities of movement routes at the current time and the day of the week and selects a highest-probability movement path. Alternatively, a learning algorithm using a hidden Markov model (HMM) is used to predict a movement path from movement path candidates determined from the movement history. According to the hidden Markov model, a movement path, i.e., a point-to-point connection, can be expressed by a typical probability state transition machine. The probability state transition machine may be pre-learned based on the user movement history extracted from the sensor information, and when a communication prediction service is provided, the current position information of the user can be input to the probability state transition machine to perform the movement path prediction.

The movement-prediction-algorithm computing unit 1306 may also employ a method for predicting a destination by analyzing the private content, such as a schedule, mail, and a memo pad, to identify a schedule therefrom, other than the method for predicting a movement path and a destination by using only the movement history. This approach makes it possible to predict how the client terminal moves from now with respect to the current position and the current time.

The communication-prediction-algorithm computing unit 1307 predicts future communication information of the client terminal by comparing the movement prediction information (the destination and the movement route) predicted by the movement-prediction-algorithm computing unit 1306 with the communication information stored in the communication information database 1301. Using the communication prediction algorithm, the communication-prediction-algorithm computing unit 1307 predicts the offline prediction position or the offline prediction time at which the client terminal goes offline on the movement path of the client terminal and the online return prediction position or the online return prediction time at which the client terminal goes online again. The communication-prediction-algorithm computing unit 1307 then outputs the predicted communication prediction information to a synchronization controller 1309.

The communication information stored in the communication information database 1301 includes, for example, information of communication history and radio-wave strength measurement history of each user, information of communication history and radio-wave strength history collected from multiple users, and information of radio-wave environments in relation to the installation information and positions of base stations of mobile-phone carriers or companies that manage Wi-Fi access points. On the basis of the communication information, the communication-prediction-algorithm computing unit 1307 can obtain radio-wave environment information, such as Wi-Fi or mobile-phone communication areas and transfer rates. The communication-prediction-algorithm computing unit 1307 checks the radio-wave environment information against the predicted movement path to determine when, where, and from which carrier the client terminal goes offline, i.e., determine an offline area for each communication carrier, on the predicted client-terminal movement path.

The synchronization-algorithm computing unit 1308 determines information of data to be subjected to the information transfer or synchronization processing with the client terminal and supplies the determined information to the synchronization controller 1309 as data information to be synchronized.

Using, for example, the information transfer/synchronization list shown in FIG. 6, the synchronization-algorithm computing unit 1308 can determine, out of the user private content stored in the private content database 1303, information of data to be subjected to the information transfer or synchronization processing with the client terminal. When the client terminal is online, newly updated data is to be subjected to the information transfer or synchronization processing (see FIG. 7). When the client terminal goes offline, the data (e.g., the private information, such as a telephone directory, account information, and household accounts) preset as being offline-ready (or data to be used while the client terminal is offline) is to be subjected to the information transfer or synchronization processing (see FIG. 8). During determination of data to be used while the client terminal is offline, the synchronization-algorithm computing unit 1308 may be adapted to refer to the user history information, such as history of previous operations of the user while offline.

In accordance with the communication prediction information supplied from the communication-prediction-algorithm computing unit 1307, the synchronization controller 1309 transmits, to the client terminal, data determined by the synchronization-algorithm computing unit 1308 as being subjected to the information transfer or synchronization.

More specifically, the synchronization controller 1309 transmits the data before the client terminal goes offline and issues, to the client terminal, a request for deleting the data when the client terminal goes online again (see FIG. 9). In this case, all of the data to be subjected to information transfer or synchronization do not necessarily have to be transmitted, and for example, only updated part of the data may be subjected to the information transfer or synchronization processing. Alternatively, the synchronization controller 1309 pre-transfers encrypted data, obtained by encrypting data to be synchronized by using the common key, to the client terminal, pre-transfers the common key for data decryption when the client terminal goes offline, and also issues, to the client terminal, a request for deleting the common key when the client terminal goes online again (see FIGS. 14A and 14B).

The client terminal receives the transfer or synchronization data from the synchronization controller 1309 and updates the held private content. The client terminal further deletes the corresponding data in the private content in accordance with the data deleting request from the synchronization controller 1309.

Alternatively, the client terminal receives the encrypted data from the synchronization controller 1309, holds the encrypted content as the private content, decrypts the encrypted data with the pre-transmitted common key when the client terminal goes offline, and performs data re-encryption and common-key deletion in accordance with the request from the synchronization controller 1309.

Figure 21:
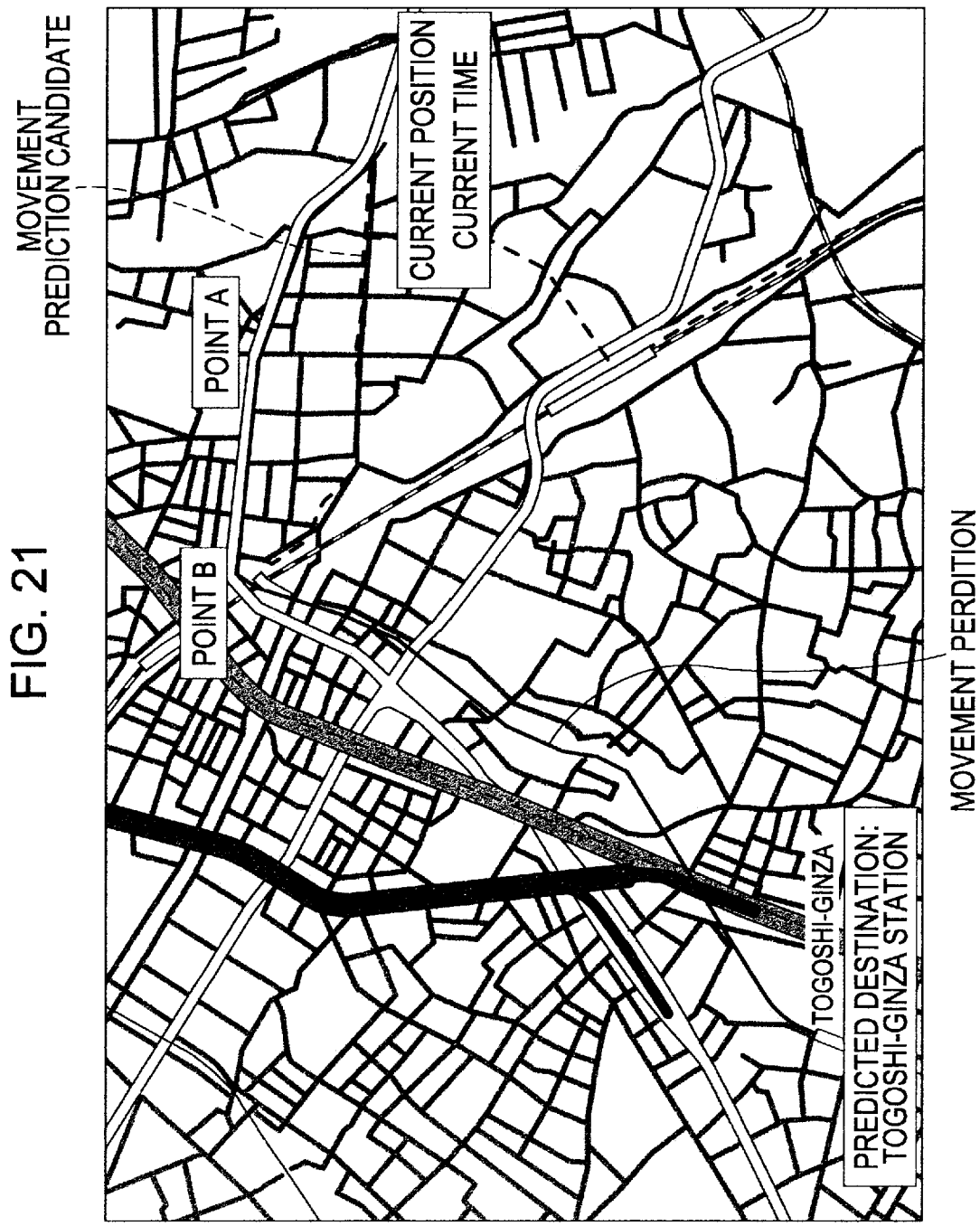
FIG. 21 illustrates one example of a result of client-terminal movement path prediction performed by a movement-prediction-algorithm computing unit.

FIG. 21 illustrates one example of a result of the client-terminal movement path prediction performed by the movement-prediction-algorithm computing unit 1306.

Upon uploading of the sensor information of the client terminal to the server, the movement-prediction-algorithm computing unit 1306 in the server first recognizes the current location of the client terminal and the current time. The movement prediction algorithm computing unit 1306 predicts how the client terminal moves from the current position from the current time, on the basis of the previous movement history of the user who is using the client terminal or the movement history of not only the corresponding user but also other users.

The movement-prediction-algorithm computing unit 1306 uses the movement history as the movement prediction algorithm to determine the probabilities of movement routes in the case of the current time and the day of the week and selects a highest-probability movement path. Alternatively, using the learning algorithm employing the hidden Markov model as the movement prediction algorithm, the movement-prediction-algorithm computing unit 1306 predicts a movement path out of one or more movement path candidates determined from the movement history.

During prediction of the movement path of the client terminal, the movement-prediction-algorithm computing unit 1306 may predict the destination of the client terminal and a movement path to the destination by using only the movement history. Alternatively, the movement-prediction-algorithm computing unit 1306 may be adapted to predict the destination by analyzing the user private content, such as a schedule, mail, and a memo pad, stored in the private content database 1303 to identify a schedule of the corresponding user.

Figure 22:
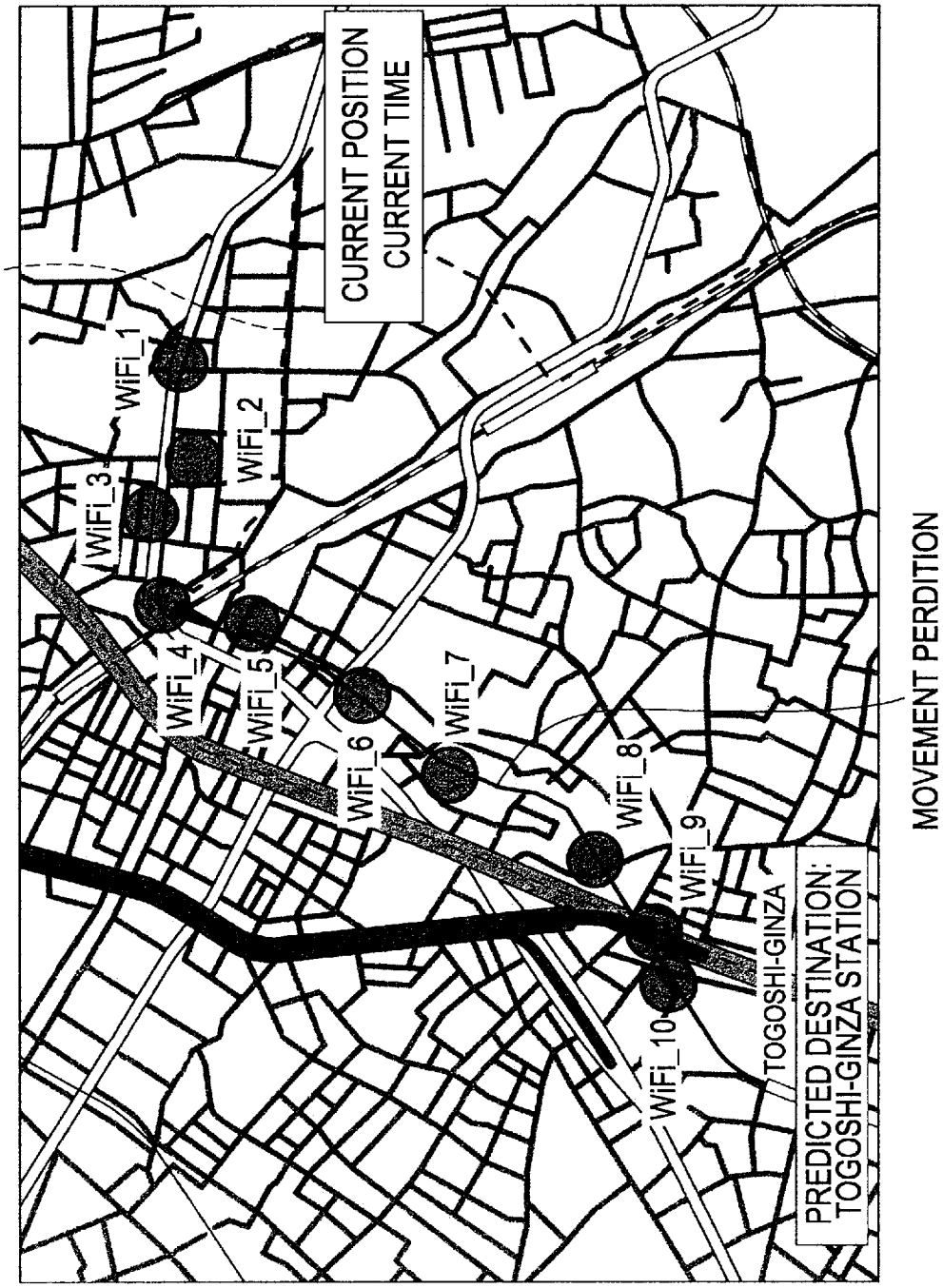
FIG. 22 illustrates offline areas, determined by a communication-prediction-algorithm computing unit, on the client-terminal movement path shown in FIG. 21.

FIG. 22 illustrates offline areas, determined by the communication-prediction-algorithm computing unit 1307, on the client-terminal movement path shown in FIG. 21. What is shown in FIG. 22 is a result of determination of Wi-Fi offline areas of a communication carrier. It is predicted that ten online areas WiFi__1, WiFi__2, . . . , and WiF__10 exist on the movement path. Thus, locations on the movement path which are outside the online areas lie in the offline areas.

The communication-prediction-algorithm computing unit 1307 notifies the synchronization controller 1309 of the communication prediction information including the offline prediction position or the offline prediction time with respect to each offline area and the online return prediction position or the online return prediction position.

The synchronization controller 1309 controls the information transfer or synchronization processing with the client terminal, in accordance with the communication prediction information supplied from the communication-prediction-algorithm computing unit 1307.

That is, when an offline area exists on the movement path of the client terminal, the synchronization controller 1309 transmits information to be used while the client terminal is offline, before the client terminal reaches the offline prediction position or the offline prediction time is reached. When the client terminal reaches the online return prediction position or the online return prediction time is reached, the synchronization controller 1309 issues, to the client terminal, a request for deleting the information transmitted for offline use.

Alternatively, the server uses the common key to encrypt the information to be used while the client terminal is offline and pre-transfers the information to the client terminal. The synchronization controller 1309 then transmits the common key before the client terminal reaches the offline prediction position or the offline prediction time is reached. Thus, with the client terminal being offline, the information to be used can be used through decryption with the common key. When the client terminal reaches the online return prediction position or the online return prediction time is reached, the synchronization controller 1309 issues, to the client terminal, a request for re-encrypting the information decrypted while offline and deleting the common key.

It is not practical to manually perform the information transfer or synchronization processing between the server and the client terminal before the client terminal goes offline. When the information transfer or synchronization processing is periodically performed between the server and the client terminal, there is a possibility that the information transfer or synchronization of the data to be used may not be performed before the client terminal goes offline. When the data to be used while the client terminal is offline is absent, for example, the data may not be referred to, edited, or deleted. Also, when the data to be used is stored in the client terminal, the problem of information leakage of data and so on related to personal information may arise.

In contrast, in the communication system according to the present embodiment, the server can predict whether or not an offline area exists on the movement path of the client terminal by performing communication prediction. On the basis of the result of the prediction, the server can perform information transfer or synchronization processing on the data to be used, such as personal information, before the client terminal goes offline. Thus, the data to be used can be referred to, edited, and deleted on the client terminal even when it is offline. Since the data transmitted before the client terminal went offline can be deleted when the client terminal returns to an online area, the problem of the information leakage is reduced.

The present application contains subject matter related to that disclosed in Japanese Priority Patent Application JP 2009-212083 filed in the Japan Patent Office on Sep. 14, 2009, the entire content of which is hereby incorporated by reference.

INDUSTRIAL APPLICABILITY

The above described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of one or more of the embodiments of the present invention comprises at least one computer-readable storage medium (also referred to as a non-transitory computer readable medium) (e.g., a computer memory, a floppy disk, a compact disk, a DVD, a tape, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1001 CPU
1002 ROM
1003 RAM
1004 storage unit
1005 bus
1006 mobile-phone transmission/reception unit
1007 wireless LAN communication unit
1008 operation unit
1009 LED
1010 vibrators
1011 sound input/output controller
1012 microphone
1013 speaker
1014 display 1015 image capture unit
1016 sensor group
1017 internal clock unit
1018 contactless IC module
1301 communication information database
1302 sensor information database
1303 private content database
1304 commercial content database
1305 contents-analysis-algorithm computing unit
1306 movement-prediction-algorithm computing unit
1307 communication-prediction-algorithm computing unit
1308 synchronization-algorithm computing unit
1309 synchronization controller
1310 upload controller

The invention claimed is:

1. A server for operating in connection with a mobile client terminal as part of a communication network, the server comprising:
   a processing unit;
   an input configured to receive sensor information from the client terminal;
   memory storing instructions which, when executed by the processing unit, cause the processing unit to determine a current location and path of the client terminal based at least partially on the sensor information and predict, based at least partially on the current location and path of the client terminal, a time at which the client terminal will enter an offline area by comparing the location and path to a service area map; and
   an output configured to transmit to the client terminal (a) data to be used by the client terminal while offline; or (b) a key to decrypt data stored on the client terminal,
   wherein the instructions, when executed, cause the processing unit to determine a time duration needed to transmit to the client terminal the (a) data to be used by the client terminal while offline; or (b) a key to decrypt data stored on the client terminal, and wherein the instructions, when executed, initiate transmission of the (a) data to be used by the client terminal while offline; or (b) key to decrypt data stored on the client terminal prior to the time at which the client terminal is predicted to enter the offline area by at least the duration,
   wherein the server is configured to store the data to be used by the client terminal while offline, and wherein the data to be used by the client terminal while offline is automatically designated as being for use while offline based on user history of the client terminal.

2. The server of claim 1, wherein the processing unit is further configured to, upon execution of the instructions stored in memory, analyze content received from the client terminal to determine a destination of the client terminal and, based at least partially on the current location of the client terminal and the destination of the client terminal, predict a path of movement of the client terminal.

3. The server of claim 2, wherein the processing unit is further configured to execute a communication prediction algorithm to compare communication information indicative of communication status against the predicted path of movement of the client terminal.

4. The server of claim 1, wherein the processing unit is configured to initiate transmission to the client terminal of (a) data to be used by the client terminal while offline prior to the predicted time at which the client terminal will enter the offline area.

5. The server of claim 1, wherein the processing unit is configured to initiate transmission to the client terminal of (b) a key to decrypt data stored on the client terminal prior to the predicted time at which the client terminal will enter the offline area.

6. A method of operating a server configured to communicate wirelessly with a mobile client terminal, the method comprising:
   receiving, at the server, sensor information from the client terminal;
   determining a current location and path of the client terminal by analyzing the sensor information;
   predicting a time at which the client terminal will enter an offline area based, at least partially, on the current location and path of the client terminal by comparing the location and path to a service area map; and
   transferring, from the server to the client terminal prior to the predicted time at which the client terminal will enter the offline area, (a) data to be used by the client terminal while offline; or (b) a key to decrypt data stored on the client terminal,
   wherein transferring comprises initiating transfer of the (a) data to be used by the client terminal while offline; or (b) key to decrypt data stored on the client terminal prior to the time at which the client terminal is predicted to enter the offline area by at least a duration determined as needed to transfer the (a) data to be used by the client terminal while offline; or (b) key to decrypt data stored on the client terminal,
   further comprising storing, at the server, the data to be used by the client terminal while offline,
   wherein the data to be used by the client terminal while offline is automatically designated as being for use while offline based on user history of the client terminal.

7. The method of claim 6, wherein predicting the time at which the client terminal will enter an offline area comprises: (i) determining a destination of the client terminal; (ii) determining, based at least partially on the current location of the client terminal and the destination of the client terminal, a predicted path of the client terminal; and (iii) determining if and where the offline area is located on the predicted path of the client terminal.

8. The method of claim 7, wherein determining if and where the offline area is located on the predicted path of the client terminal comprises analyzing communication information stored on the server and indicative of communication status along the predicted path.

9. A non-transitory computer readable storage medium encoded with instructions which, when executed by a server coupled to a client terminal via a network, cause the server to perform a method of operation comprising:
   receiving, at the server, sensor information from the client terminal;
   determining a current location and path of the client terminal by analyzing the sensor information;
   predicting a time at which the client terminal will enter an offline area based, at least partially, on the current location and path of the client terminal by comparing the location and path to a service area map; and
   transferring, from the server to the client terminal prior to the predicted time at which the client terminal will enter the offline area, (a) data to be used by the client terminal while offline; or (b) a key to decrypt data stored on the client terminal,
   wherein transferring comprises initiating transfer of the (a) data to be used by the client terminal while offline; or (b) key to decrypt data stored on the client terminal prior to the time at which the client terminal is predicted to enter the offline area by at least a duration determined as needed to transfer the (a) data to be used by the client terminal while offline; or (b) key to decrypt data stored on the client terminal, wherein the method further comprises storing, at the server, the data to be used by the client terminal while offline, wherein the data to be used by the client terminal while offline is automatically designated as being for use while offline based on user history of the client terminal.

\* \* \* \* \*